(12) United States Patent
Yamada et al.

(10) Patent No.: US 9,367,438 B2
(45) Date of Patent: Jun. 14, 2016

(54) SEMICONDUCTOR INTEGRATED CIRCUIT AND METHOD FOR OPERATING SAME

(75) Inventors: Hiromichi Yamada, Tokyo (JP); Nobuyasu Kanekawa, Tokyo (JP); Teruaki Sakata, Tokyo (JP); Kesami Hagiwara, Kanagawa (JP); Yuichi Ishiguro, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 157 days.

(21) Appl. No.: 14/110,786

(22) PCT Filed: Apr. 21, 2011

(86) PCT No.: PCT/JP2011/059807
§ 371 (c)(1),
(2), (4) Date: Oct. 9, 2013

(87) PCT Pub. No.: WO2012/144043
PCT Pub. Date: Oct. 26, 2012

(65) Prior Publication Data
US 2014/0032860 A1    Jan. 30, 2014

(51) Int. Cl.
*G06F 12/02* (2006.01)
*G06F 11/16* (2006.01)

(52) U.S. Cl.
CPC .............. *G06F 12/02* (2013.01); *G06F 11/167* (2013.01); *G06F 11/1641* (2013.01); *G06F 11/1687* (2013.01); *G06F 2201/845* (2013.01)

(58) Field of Classification Search
CPC ... G06F 12/02; G06F 11/1629; G06F 11/167; G06F 11/1641; G06F 11/1687
USPC .......................... 711/169, 159, 170; 710/310
See application file for complete search history.

(56) References Cited

U.S. PATENT DOCUMENTS 6,289,022 B1 * 9/2001 Gale .......................... H04L 1/22
714/11
6,820,213 B1 * 11/2004 Somers ................. G06F 11/165
714/11

(Continued)

FOREIGN PATENT DOCUMENTS

JP     04-138532 A     5/1992
JP     06-324900 A     11/1994

(Continued)

OTHER PUBLICATIONS

Emmerson et al., "Fault Tolerance Achieved in VLSI", IEEE Micro, Dec. 1984, pp. 34-43.

(Continued)

*Primary Examiner* — Pierre-Michel Bataille
(74) *Attorney, Agent, or Firm* — Mattingly & Malur, PC

(57) ABSTRACT

First data to be written which is output from a function module (2) is supplied to a built-in memory (3) and a first buffer memory (11), and second data to be written which is output from the function module (2) is supplied to the built-in memory (3) and a second buffer memory (12). The first and second FIFO memories (13, 14) select and store data items having a predetermined number of outputs from a plurality of first and second output data items which are sequentially output from the first and second buffer memories (11, 12), and do not select other data items. A comparator (15) compares the data items having the predetermined number of outputs which are selected and are output by the first and second FIFO memories (13, 14) with each other.

14 Claims, 17 Drawing Sheets

(56) References Cited

U.S. PATENT DOCUMENTS

| | | | |
|---|---|---|---|
| 8,774,295 B2* | 7/2014 | Okehie | 375/260 |
| 2002/0133745 A1* | 9/2002 | Okin | 714/11 |
| 2007/0277023 A1 | 11/2007 | Weiberle et al. | |
| 2010/0131741 A1 | 5/2010 | Yamada et al. | |
| 2013/0097369 A1* | 4/2013 | Talagala et al. | 711/103 |
| 2014/0025877 A1* | 1/2014 | Talagala et al. | 711/103 |

FOREIGN PATENT DOCUMENTS

| | | | |
|---|---|---|---|
| JP | 07-146802 A | 6/1995 |
| JP | 08-241217 A | 9/1996 |
| JP | 10-261762 A | 9/1998 |
| JP | 2004-234144 A | 8/2004 |
| JP | 2007-507015 A | 3/2007 |
| JP | 2010-113388 A | 5/2010 |

OTHER PUBLICATIONS

Japanese Office Action received in corresponding Japanese Application No. 2013-510786 dated Jul. 24, 2014.

* cited by examiner

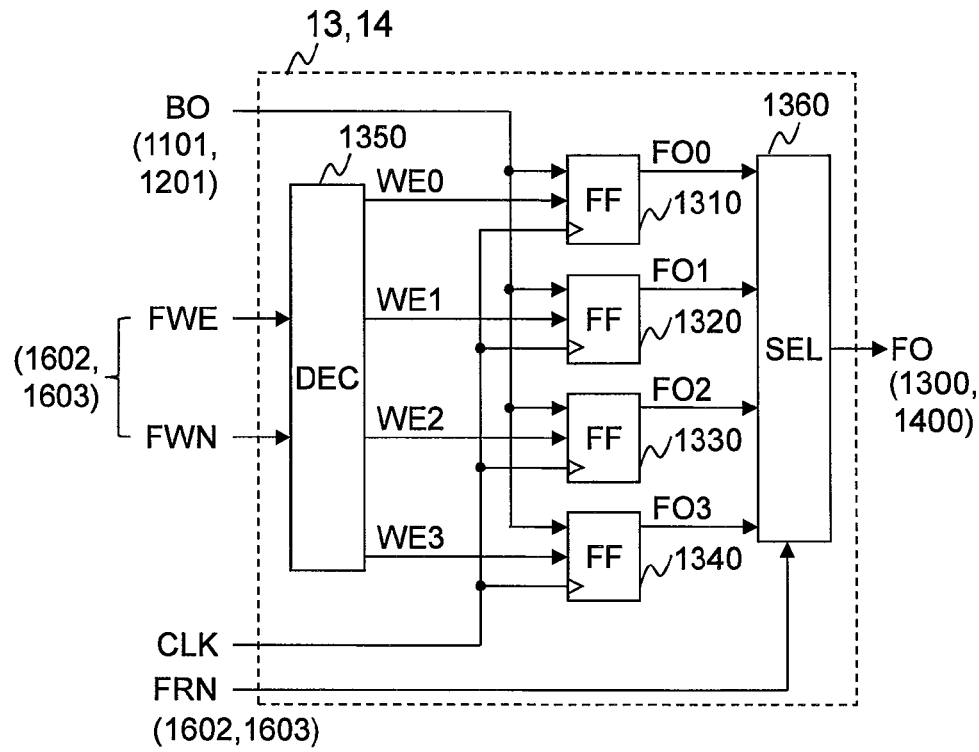
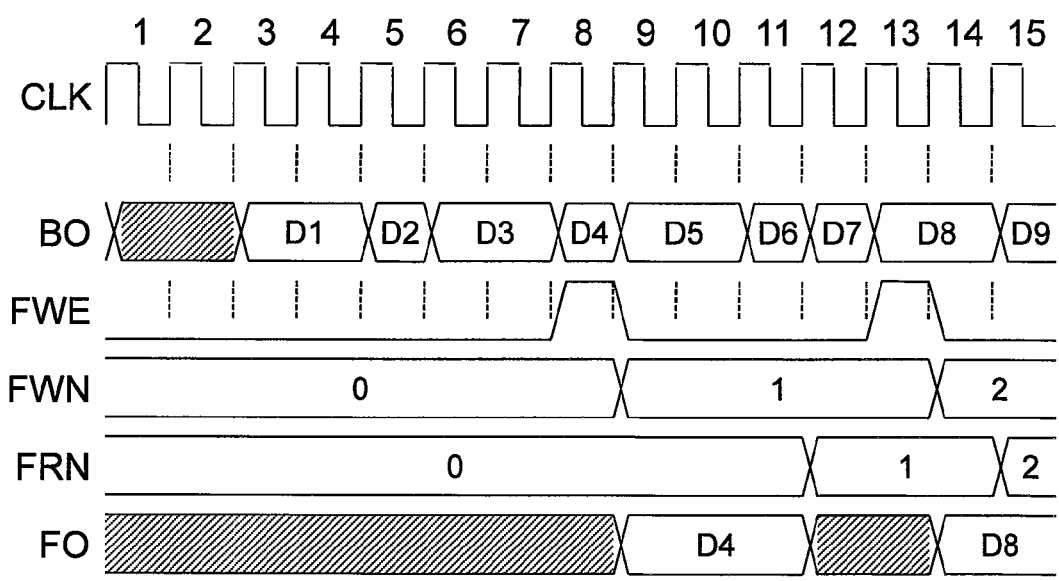

SEMICONDUCTOR INTEGRATED CIRCUIT AND METHOD FOR OPERATING SAME

TECHNICAL FIELD

The present invention relates to a semiconductor integrated circuit and a method for operating the same, and particularly to an effective technique which enables continuous data to be written to be stored in a built-in memory during multiple redundant operations for inspecting a semiconductor integrated circuit and further enables an alleviation of a FIFO, which is used for a comparator to compare outputs of the multiple redundant operations, from being easily full of written data.

BACKGROUND ART

A microcontroller is a semiconductor integrated circuit which is incorporated into apparatuses such as home electric appliances, AV apparatuses, mobile phones, automobiles, and industrial machinery, and executes data processes according to programs stored in a memory, thereby controlling the various apparatuses.

Particularly, in an automobile field, since failures of a control device may cause accidents, components including the microcontroller are required to have high reliability, and are thus designed to operate a safety function so as not to expose an automobile to a dangerous state by detecting failures when the failures occur. Further, the in-vehicle microcontroller is required to diagnose various sensors or actuators mounted in an automobile so as to not only detect failures thereof but also detect failures of the in-vehicle microcontroller.

There are a variety of methods for detecting failures of the microcontroller, and a method is used in which two CPUs are used and execute the same process, and values of buses are compared with each other.

The following NPL 1 discloses that a master module and a checker module for use in comparison execute the same process together, and respective process results are compared by a comparison circuit, thereby detecting errors.

The following PTL 1 discloses that two CPUs, two memories, and a bus comparator are used, and output signals of both CPUs are compared by the bus comparator.

In addition, the following PTL 2 discloses that three CPUs, three memories, three FIFOs, and three comparison circuits are used, and output signals of the three CPUs are supplied to inputs of the three comparison circuits via the three FIFOs such that the three comparison circuits compare the output signals of the three CPUs with each other.

Further, the following PTL 3 discloses that a plurality of output signals of a plurality of CPUs are compressed with each other by a plurality of compressors and a plurality of compression results of the plurality of compressors are compared with each other by a comparator, and discloses that a plurality of output signals of the plurality of CPUs are supplied to a plurality of inputs of the comparator via a plurality of FIFOs such that the output signals of the plurality of CPUs are compared with each other by the comparator.

CITATION LIST

Patent Literature

[PTL 1] JP-A-10-261762
[PTL 2] JP-A-6-324900
[PTL 3] JP-A-2010-113388

Non Patent Literature

[NPL 1] Richard Emmerson et al., "Fault Tolerance Achieved in VLSI", 1984 IEEE MICRO, PP. 34 to 43.

DISCLOSURE OF THE INVENTION

Problems that the Invention is to Solve

The present inventors prior to realizing the present invention have been engaged in research and development of a microcontroller which can be mounted in an automobile and is required to have high safety and high accuracy.

In the research and development preceding the present invention conducted by the present inventors, the present inventors first examined the method disclosed in the above-described PTL 3 in which the FIFO is used, and output signals of a plurality of CPUs are compared with each other by a comparator. The reason is that the FIFO is a memory which does not compress data and stores and outputs supplied data in a first-in/first-out manner, and can perform a high speed storage process and a high speed output process. In contrast, a compressor uses a complex compression algorithm such as a linear feedback shift register (LFSR) or a cyclic redundancy check (CRC), and thus has a defect in which a compression process period preceding a comparison process in the comparator is lengthened.

On the other hand, a CPU which is a core of the microcontroller has achieved high speed and high performance according to miniaturization of a semiconductor manufacturing process, and a processing speed of the CPU has improved every year. As such, whereas a processing speed of the CPU improves, a problem in which a compression process period of the compressor in a comparison process of multiple outputs of the CPU for failure diagnosis of the microcontroller is lengthened remains as a serious defect. In contrast, in the method disclosed in the above-described PTL 3 in which a FIFO is used, and output signals of a plurality of CPUs are compared with each other by a comparator, a circuit scale or power consumption is small, and a high speed storage process and a high speed output process can be performed, and thus the method is very useful.

However, from the research and development preceding the present invention conducted by the present inventors, a problem has become clear in which, since a large amount of data to be written is supplied from the CPU to the FIFO during an operation period of failure diagnosis or failure inspection due to the improvement in processing speed of the CPU, there is no vacancy region in the FIFO so as to stop writing of the CPU, and therefore a wait request signal is required to be output from the FIFO to the CPU. The CPU is stalled or waits due to this wait request signal, and thus data processing of the CPU is delayed.

In order to solve the problem, a method has been examined in which an amount of data to be written from the CPU to the FIFO is reduced by not continuously but intermittently operating the CPU during an operation period of failure diagnosis or failure inspection of the microcontroller. However, in this method, data to be written from the CPU to the memory is not continuous data but discontinuous and discrete data. In other words, a problem has become clear, from the examination by the present inventors before the present invention, in which continuous written data cannot be read from the memory in a normal operation data process in a case where content of redundant operations which are executed by a plurality of CPUs and are compared with each other by the comparator during an operation period of failure diagnosis or failure inspection of the microcontroller is content of a normal operation data process which was previously performed by any one of the plurality of CPUs.

Further, in order to solve the problem, a method has been examined in which an amount of data to be written from the CPU to the FIFO is reduced by operating the CPU not at normal high speed but at low speed for a diagnosis inspection during an operation period of failure diagnosis or failure inspection of the microcontroller. However, in this method, another problem has become clear, from the examination by the present inventors, in which a probability of detecting abnormality or failures of the CPU is notably reduced since a processing speed of the CPU in the low speed operation is considerably lower than in the normal high speed operation.

The present invention has been made as a result of the above-described examination by the present inventors before the present invention.

Therefore, an object of the present invention is to store continuous data to be written in a built-in memory during multiple redundant operations for inspecting a semiconductor integrated circuit and to alleviate a FIFO, used for a comparator to compare outputs of the multiple redundant operations, being easily full of written data.

Another object of the present invention is to improve a probability of detecting abnormality or failures.

The above-described objects, other objects, and novel features of the present invention will become apparent from description of the present specification and the accompanying drawings.

Means for Solving the Problems

The representative inventions of the inventions disclosed in the present application will be described briefly as follows.

In other words, a semiconductor integrated circuit (1) according to a representative embodiment of the present invention includes a function module (2), a built-in memory (3), a first buffer memory (11), a second buffer memory (12), a first FIFO memory (13), a second FIFO memory (14), and a comparator (15).

First data to be written which is output from the function module is supplied to the built-in memory and the first buffer memory during a first operation of the multiple redundant operations for inspecting the semiconductor integrated circuit, and second data to be written which is output from the function module is supplied to the built-in memory and the second buffer memory during a second operation of the multiple redundant operations for inspecting the semiconductor integrated circuit.

During the first operation, the first FIFO memory selects and stores data items having a predetermined number of outputs from a plurality of first output data items which are sequentially output from the first buffer memory, and does not select other data items having the number of outputs which is different from the predetermined number of outputs.

During the second operation, the second FIFO memory selects and stores data items having the predetermined number of outputs from a plurality of second output data items which are sequentially output from the second buffer memory, and does not select other data items having the number of outputs which is different from the predetermined number of outputs.

The comparator compares the data items having the predetermined number of outputs which are selected and are output by the first FIFO memory with the data items having the predetermined number of outputs which are selected and are output by the second FIFO memory (refer to FIG. 21).

Effects of the Invention

Brief description of effects achieved by the representative invention of the inventions disclosed in the present application is as follows. In other words, according to the representative present invention, it is possible to store continuous data to be written in the built-in memory during the multiple redundant operations for inspecting the semiconductor integrated circuit and to alleviate the FIFO, used for the comparator to compare outputs of the multiple redundant operations, being easily full of written data.

BRIEF DESCRIPTION OF THE DRAWINGS

FIG. 4 is a diagram illustrating a configuration of a FIFOA 13 and a FIFOB 14 which are FIFO memories included in the dual-core microcontroller MCU 1 according to the first embodiment of the present invention shown in FIG. 1.

FIG. 5 is a diagram illustrating an operation of the FIFOA 13 and the FIFOB 14 which are FIFO memories shown in FIG. 4 included in the dual-core microcontroller MCU 1 according to the first embodiment of the present invention.

DESCRIPTION OF EMBODIMENTS

1. Summary of the Embodiments

Figure 1:
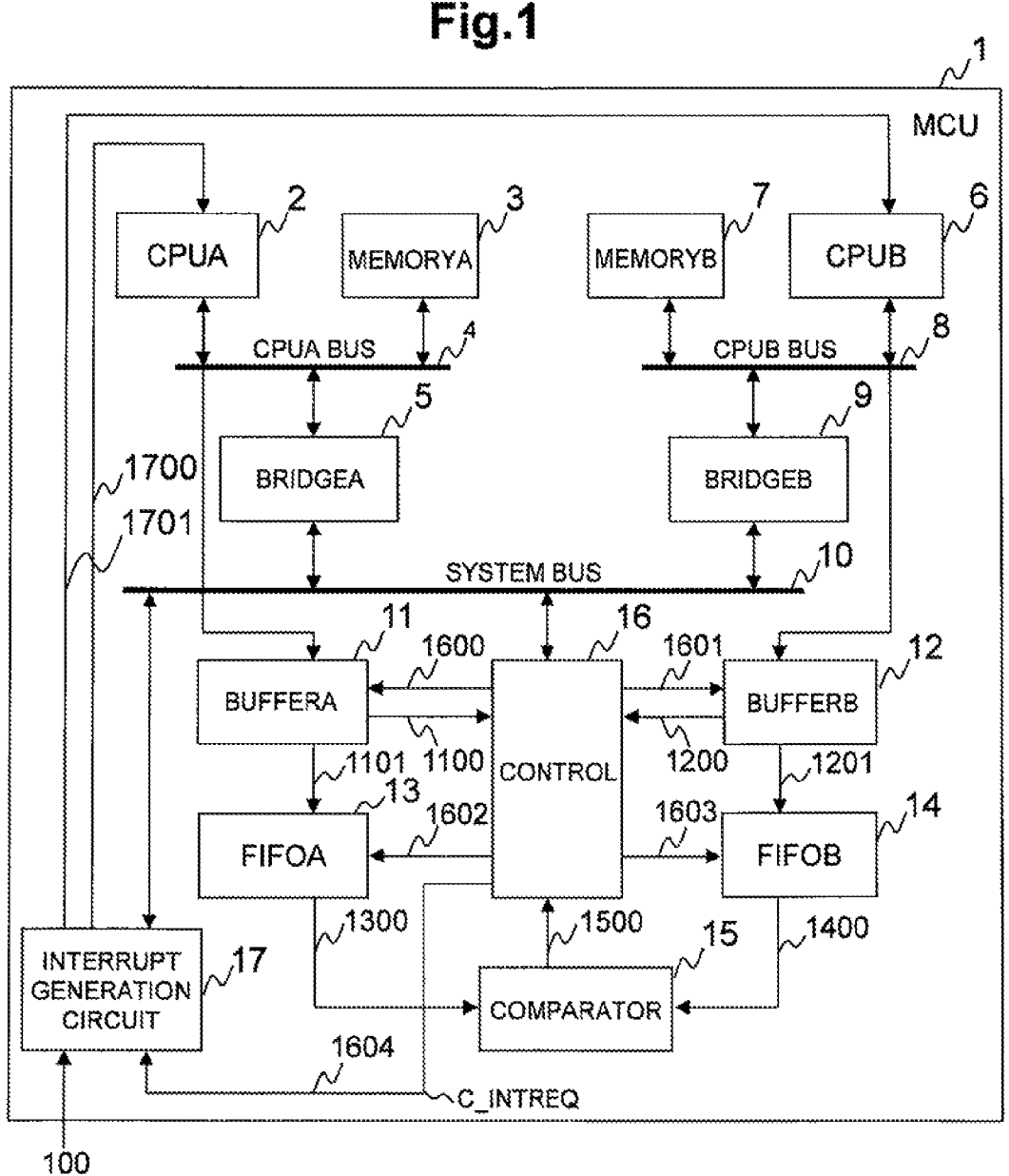
FIG. 1 is a diagram illustrating a configuration of a dual-core microcontroller MCU 1 according to a first embodiment of the present invention.

First, summary of the representative embodiments of the invention disclosed in the present application will be described. In the description of the summary of the representative embodiments, a reference numeral of the drawings, which is referenced in a parenthesis, just exemplifies that the reference numeral is included in a concept of a constituent element with the reference numeral.

[1] A semiconductor integrated circuit (1) according to a representative embodiment of the present invention includes a function module (2), a built-in memory (3), a first buffer memory (11), a second buffer memory (12), a first FIFO memory (13), a second FIFO memory (14), and a comparator (15).

First data to be written which is output from the function module is supplied to the built-in memory and the first buffer memory during a first operation of the multiple redundant operations for inspecting the semiconductor integrated circuit, and second data to be written which is output from the function module is supplied to the built-in memory and the second buffer memory during a second operation of the multiple redundant operations for inspecting the semiconductor integrated circuit.

During the first operation, the first FIFO memory selects and stores data items having a predetermined number of outputs from a plurality of first output data items which are sequentially output from the first buffer memory, and does not select other data items having the number of outputs which is different from the predetermined number of outputs.

During the second operation, the second FIFO memory selects and stores data items having the predetermined number of outputs from a plurality of second output data items which are sequentially output from the second buffer memory, and does not select other data items having the number of outputs which is different from the predetermined number of outputs.

Figure 21:
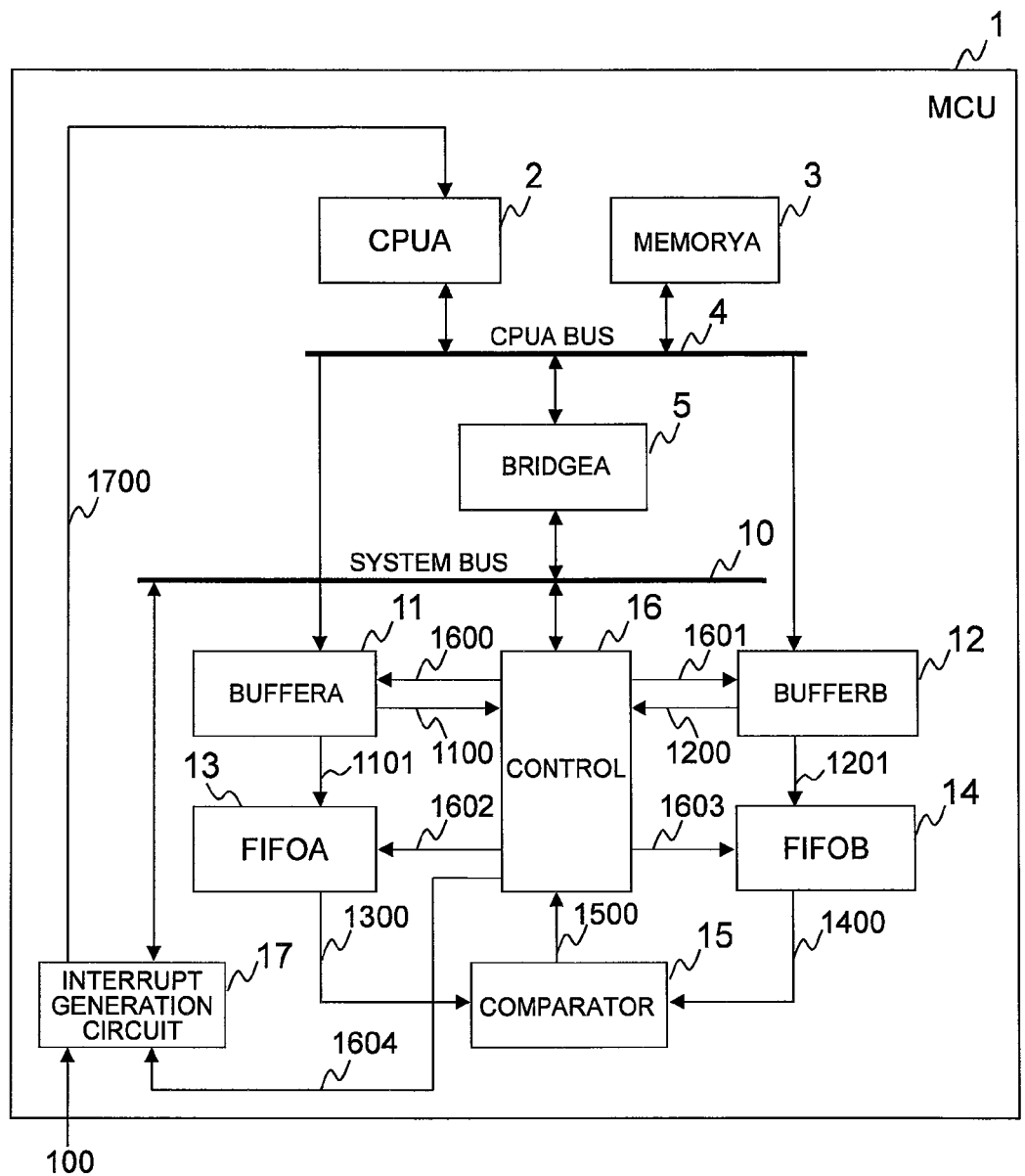
FIG. 21 is a diagram illustrating a configuration of a single-core microcontroller MCU 1 according to a third embodiment of the present invention.

The comparator compares the data items having the predetermined number of outputs which are selected and are output by the first FIFO memory with the data items having the predetermined number of outputs which are selected and are output by the second FIFO memory (refer to FIG. 21).

According to the above-described embodiment, it is possible to store continuous data to be written in the built-in memory during the multiple redundant operations for inspecting the semiconductor integrated circuit and to alleviate the FIFO, used for the comparator to compare outputs of the multiple redundant operations, being easily full of written data.

In a preferred embodiment, the function module includes at least a first function module (2) and a second function module (6).

The built-in memory includes at least a first built-in memory (3) and a second built-in memory (7).

The first data to be written which is output from the first function module is supplied to the first built-in memory and the first buffer memory during the first operation.

The second data to be written which is output from the second function module is supplied to the second built-in memory and the second buffer memory during the second operation (refer to FIG. 1).

In another preferred embodiment, the first function module and the second function module are respectively a first central processing unit (2) and a second central processing unit (6) (refer to FIG. 1).

In still another preferred embodiment, the first buffer memory may count a first number of outputs (BCA) of the plurality of first data items to be written which are sequentially supplied to the first buffer memory during the first operation.

Figure 2:
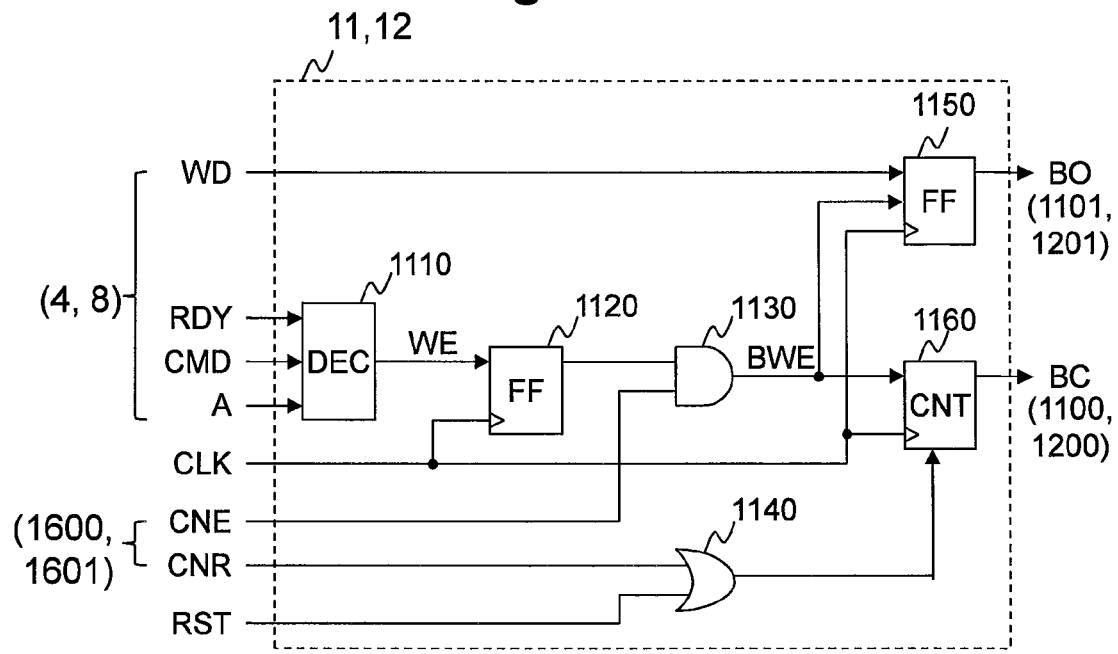
FIG. 2 is a diagram illustrating a configuration of bufferA 11 and bufferB 12 which are buffer memories included in the dual-core microcontroller MCU 1 according to the first embodiment of the present invention shown in FIG. 1.
Figure 3:
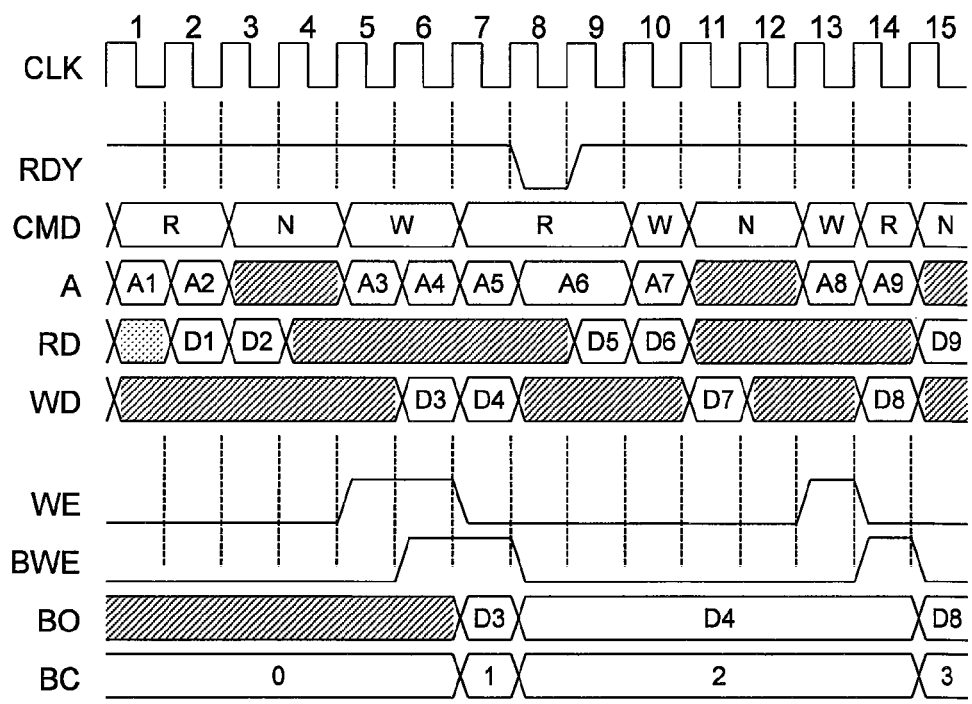
FIG. 3 is a diagram illustrating an operation of the bufferA 11 and the bufferB 12 which are buffer memories shown in FIG. 2 included in the dual-core microcontroller MCU 1 according to the first embodiment of the present invention.

The second buffer memory may count a second number of outputs (BCB) of the plurality of second data items to be written which are sequentially supplied to the second buffer memory during the second operation (refer to FIGS. 2 and 3).

The semiconductor integrated circuit according to a more preferred embodiment further includes a control unit (16) that is connected to the first buffer memory, the second buffer memory, the first FIFO memory, and the second FIFO memory (refer to FIG. 1).

The control unit includes a first register (1625) and a second register (1635) which can store information (4, 8, 12, . . . ) of the predetermined number of outputs.

In response to the first number of outputs (BCA) counted by the first buffer memory matching the information (FCNA) stored in the first register, the control unit may supply a first FIFO write enable signal (FWEA) for enabling the first FIFO memory to select and store the data items having the predetermined number of outputs, to the first FIFO memory.

Figure 8:
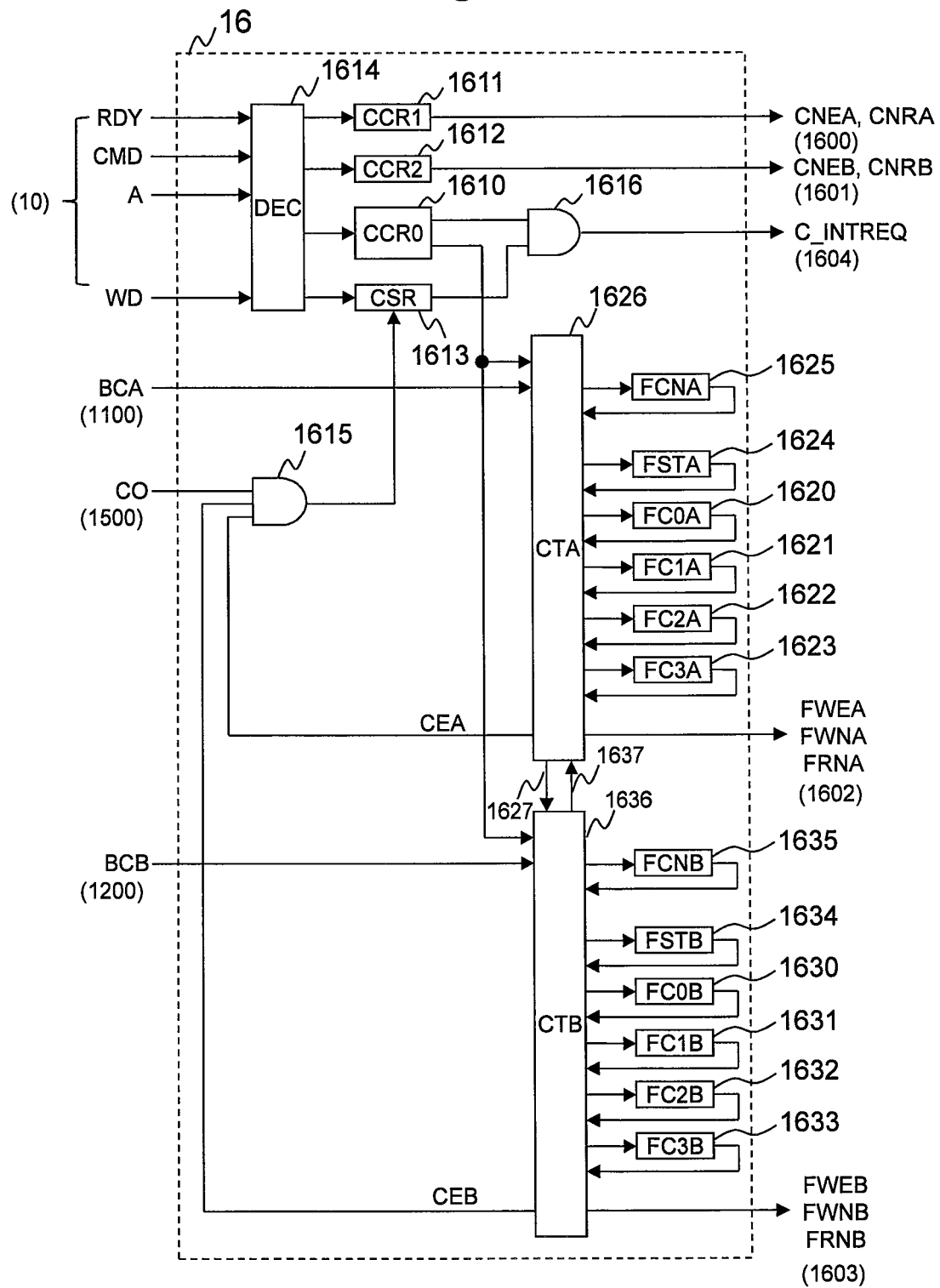
FIG. 8 is a diagram illustrating a configuration of a control unit 16 included in the dual-core microcontroller MCU 1 according to the first embodiment of the present invention shown in FIG. 1.

In response to the second number of outputs (BCB) counted by the second buffer memory matching the information (FCNB) stored in the second register, the control unit may supply a second FIFO write enable signal (FWEB) for enabling the second FIFO memory to select and store the data items having the predetermined number of outputs, to the second FIFO memory (refer to FIG. 8).

Figure 18:
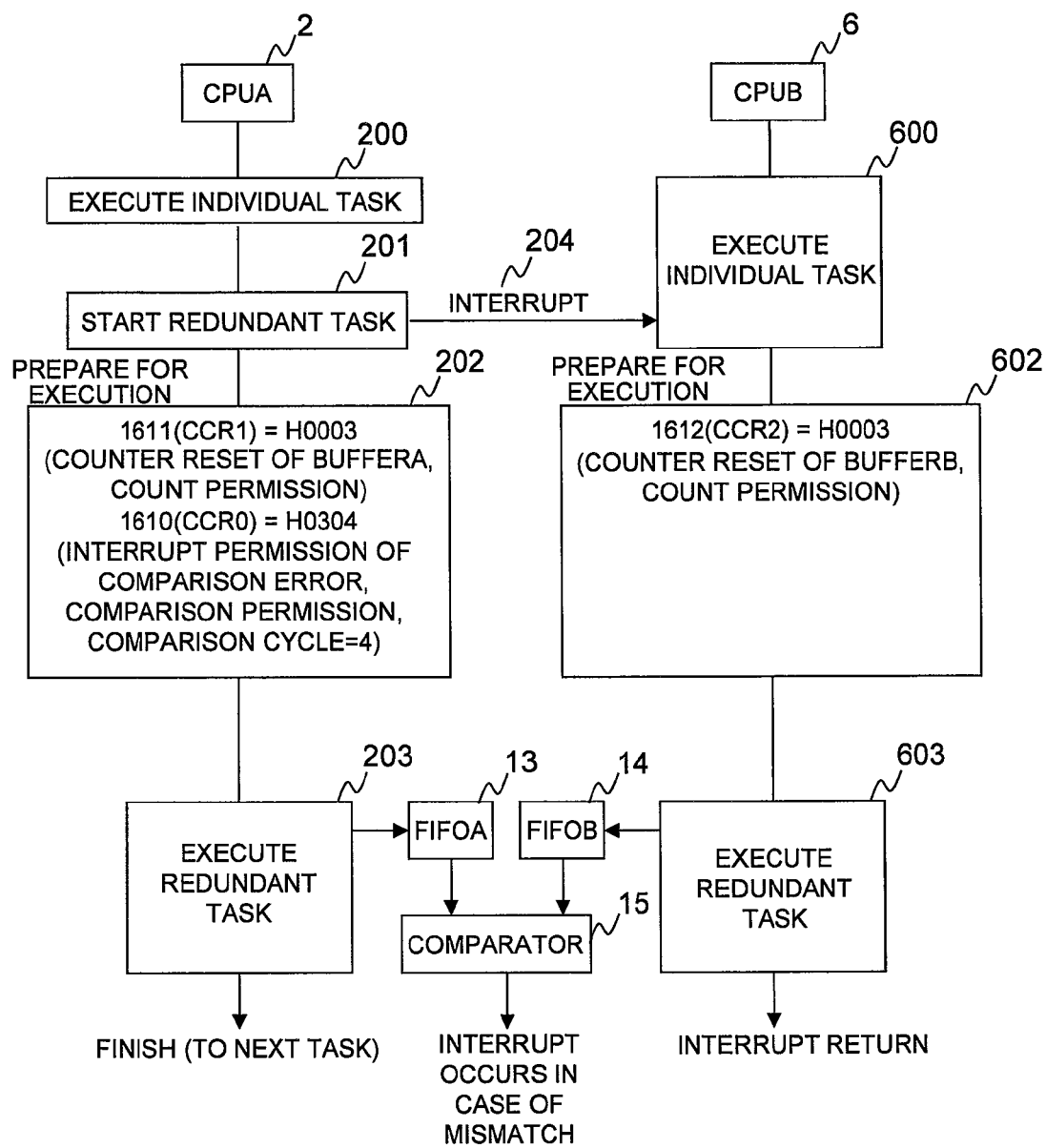
FIG. 18 is a diagram illustrating a state in which transfer is performed from a parallel data process performed by two CPUA 2 and CPUB 6 in a normal operation of the dual-core microcontroller MCU 1 to a redundant operation performed by both CPUA 2 and CPUB 6 for a failure detection operation in the first embodiment of the present invention shown in FIG. 1.

In another more preferred embodiment, content of the first operation and the second operation of the multiple redundant operations may be regarded as content of a normal operation which was previously performed by either one of the first central processing unit and the second central processing unit (refer to FIG. 18).

In still another more preferred embodiment, transfer from the normal operation to the multiple redundant operations may be performed by an interrupt (204) from one of the first central processing unit and the second central processing unit in which execution of the normal operation is in progress to the other thereof (refer to FIG. 18).

In still another more preferred embodiment, the first buffer memory includes a first flip-flop (1150) that stores the first output data (1101) which is output to the first FIFO memory and a first operating circuit (1170) that has one input terminal and the other input terminal to which the first data to be written and the first output data of an output terminal of the first flip-flop are respectively supplied, and an output signal generated from an output terminal of the first operating circuit may be stored in the first flip-flop.

Figure 19:
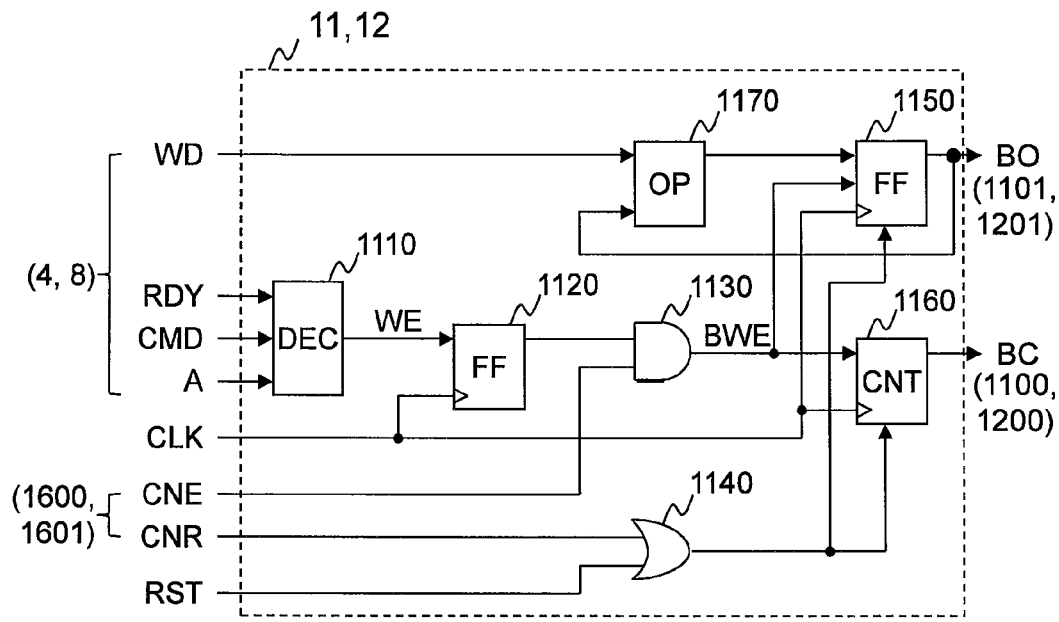
FIG. 19 is a diagram illustrating another configuration of the bufferA 11 and the bufferB 12 which are buffer memories according to a second embodiment of the present invention, included in the dual-core microcontroller MCU 1 shown in FIG. 1.

The second buffer memory includes a second flip-flop that stores the second output data which is output to the second FIFO memory and a second operating circuit that has one input terminal and the other input terminal to which the second data to be written and the second output data of an output terminal of the second flip-flop are respectively supplied, and an output signal generated from an output terminal of the second operating circuit can be stored in the second flip-flop (refer to FIG. 19).

In a specific embodiment, when a comparison result by the comparator between the data items having the predetermined number of outputs which are output by the first FIFO memory and the data items having the predetermined number of outputs which are output by the second FIFO memory indicates that the data items of both match each other, the semiconductor integrated circuit is determined as being normal, and when the comparison result indicates that the data items of both mismatch each other, the semiconductor integrated circuit is determined as being abnormal (refer to FIG. 21).

In the most specific embodiment, the first central processing unit executes commands for the normal operation, stored in the first built-in memory, and the second central processing unit executes commands for the normal operation, stored in the second built-in memory, such that the semiconductor integrated circuit can be operated as a microcontroller with multiple cores (refer to FIG. 1).

[2] A representative embodiment of another viewpoint of the present invention is a method for operating a semiconductor integrated circuit (1) including a function module (2), a built-in memory (3), a first buffer memory (11), a second buffer memory (12), a first FIFO memory (13), a second FIFO memory (14), and a comparator (15).

First data to be written which is output from the function module is supplied to the built-in memory and the first buffer memory during a first operation of the multiple redundant operations for inspecting the semiconductor integrated circuit, and second data to be written which is output from the function module is supplied to the built-in memory and the second buffer memory during a second operation of the multiple redundant operations for inspecting the semiconductor integrated circuit.

During the first operation, the first FIFO memory selects and stores data items having a predetermined number of outputs from a plurality of first output data items which are sequentially output from the first buffer memory, and does not select other data items having the number of outputs which is different from the predetermined number of outputs.

During the second operation, the second FIFO memory selects and stores data items having the predetermined number of outputs from a plurality of second output data items which are sequentially output from the second buffer memory, and does not select other data items having the number of outputs which is different from the predetermined number of outputs.

The comparator compares the data items having the predetermined number of outputs which are selected and are output by the first FIFO memory with the data items having the predetermined number of outputs which are selected and are output by the second FIFO memory (refer to FIG. 21).

According to the above-described embodiment, it is possible to store continuous data to be written in the built-in memory during the multiple redundant operations for inspecting the semiconductor integrated circuit and to alleviate the FIFO, used for the comparator to compare outputs of the multiple redundant operations, being easily full of written data.

2. Further Detailed Description of the Embodiments

The embodiments will be described in more detail. In addition, elements having the same function are given the same reference numerals throughout all the drawings for describing the embodiments, and repeated description thereof will be omitted.

[First Embodiment]

<<Configuration of Dual-core Microcontroller>>

FIG. 1 is a diagram illustrating a configuration of a dual-core microcontroller MCU 1 according to the first embodiment of the present invention.

The dual-core microcontroller MCU 1 according to the first embodiment of the present invention shown in FIG. 1 can compare outputs of two CPUA 2 and CPUB 6 with each other. In addition, internal circuits of the dual-core microcontroller MCU 1 shown in FIG. 1 are integrated inside a semiconductor chip of a semiconductor integrated circuit.

The CPUA 2 which is a first central processing unit is a processor which executes processes such as calculation or data transmission by executing commands, and a memoryA 3 which is a first built-in memory stores commands executed by the CPUA 2 and data processed thereby. A CPUA bus 4 which is a first CPU bus is a bus used for the CPUA 2 to access devices such as the memoryA 3, and a bridgeA 5 which is a first bus bridge is a controller which controls connection between the CPUA bus 4 and a system bus 10 in a case where the CPUA 2 accesses other devices via the system bus 10.

The CPUB 6 which is a second central processing unit is a processor which executes processes such as an operation or data transmission by executing commands, and a memoryB 7 which is a second built-in memory stores commands executed by the CPUB 6 and data processed thereby. A CPUB bus 8 which is a second CPU bus is a bus used for the CPUB 6 to access devices such as the memoryB 7, and a bridgeB 9 which is a second bus bridge is a controller which controls connection between the CPUB bus 8 and the system bus 10 in a case where the CPUB 6 accesses other devices via the system bus 10.

A bufferA 11 which is a first buffer memory holds data to be written which is output to a specific address space by the CPUA 2 and counts the number of outputs thereof. A bufferB 12 which is a second buffer memory holds data to be written which is output to a specific address space by the CPUB 6 and counts the number of outputs thereof. A FIFOA 13 which is a first FIFO memory holds output data 1101 of the bufferA 11, and a FIFOB 14 which is a second FIFO memory holds output data 1201 of the bufferB 12. The technical terminology "the specific address space" here means address spaces for doubly writing data to be written which is output from the CPUA 2 and the CPUB 6 in the memoryA 3 and the memoryB 7, and the bufferA 11 and the bufferB 12.

A comparator 15 compares output data 1300 of the FIFOA 13 with output data 1400 of the FIFOB 14. The control unit 16 is connected to the system bus 10, and thus a register can be set therein from the CPUA 2 and the CPUB 6. An output signal 1600 of the control unit 16 is a signal for clearing a counter, holding data, and permitting counting in the bufferA 11, and an output signal 1601 of the control unit 16 is a signal for clearing a counter, holding data, and permitting counting in the bufferB 12. A count signal 1100 output from the bufferA 11 and a count signal 1200 output from the bufferB 12 are supplied to the control unit 16, and the control unit 16 outputs control signals 1602 and 1603 to the FIFOA 13 and the FIFOB 14. In addition, a comparison result signal 1500 is supplied to the control unit 16 from the comparator 15, and the comparison result is held in a register inside the control unit 16. If the comparison result indicates mismatch, the control unit 16 may output an interrupt request signal 1604 (C_INTREQ) to the interrupt generation circuit 17.

The interrupt generation circuit 17 is connected to the system bus 10, and thus a register can be set therein from the CPUA 2 and the CPUB 6. An interrupt request can be supplied to the interrupt generation circuit 17 from an interrupt request terminal 100.

Although not shown in FIG. 1, the dual-core microcontroller MCU 1 includes function modules such as an A/D converter, a timer, and serial communication, and an interrupt request from these function modules can be supplied to the interrupt generation circuit 17. Priorities are set for a plurality of interrupt requests in the interrupt generation circuit 17 such that an interrupt request with the highest priority is selected, and an interrupt request 1700 is output to the CPUA 2 and an interrupt request 1701 is output to the CPUB 6 from the interrupt generation circuit 17.

<<Normal Operation in Dual-core Microcontroller>>

The dual-core microcontroller MCU 1 according to the first embodiment of the present invention shown in FIG. 1 enables both CPUA 2 and CPUB 6 to execute independent data processes in parallel in order to realize a high performance. Parallel process results performed by both CPUA 2 and CPUB 6 may be stored in parallel in both memoryA 3 and memoryB 7. Further, data of both memoryA 3 and memoryB 7 may be transmitted to the system bus 10 via both bridgeA 5 and bridgeB 9.

<<Redundant Operation in Dual-core Microcontroller>>

In order to realize a high reliability, the dual-core microcontroller MCU 1 according to the first embodiment of the present invention shown in FIG. 1 executes a redundant operation in which both CPUA 2 and CPUB 6 are made to execute the same data process and failures are detected by detecting mismatch between process results.

For this redundant operation, both CPUA 2 and CPUB 6 execute the same redundant task program on the same operand data. In a case where there is no failure in the dual-core microcontroller MCU 1 shown in FIG. 1 and both CPUA 2 and CPUB 6 are normally operated, data items to be written, which are output to specific address spaces from both CPUA 2 and CPUB 6 and are doubly written in the memoryA 3 and memoryB 7 and the bufferA 11 and bufferB 12, are the same as each other. However, in a case where a failure occurs in the dual-core microcontroller MCU 1 shown in FIG. 1 and one of both CPUA 2 and CPUB 6 is abnormally operated, data items to be written, which are output to specific address spaces from both CPUA 2 and CPUB 6 and are doubly written in the memoryA 3 and memoryB 7 and the bufferA 11 and bufferB 12, do not mismatch each other, and thus the failure can be detected.

Both FIFOA 13 and FIFOB 14 select only data items having a predetermined number of outputs from a plurality of data items which are sequentially output and supplied from both CPUA 2 and CPUB 6 via both bufferA 11 and bufferB 12 as results of the redundant task operation so as to be stored, and do not select data of other numbers of outputs so as to be discarded. The data items having the predetermined number of outputs which are selected and output by both FIFOA 13 and FIFOB 14 are compared with each other by the comparator 15. If a comparison result performed by the comparator 15 indicates match, it is determined that there is no failure in the dual-core microcontroller MCU 1 shown in FIG. 1, and if a comparison result performed by the comparator 15 indicates mismatch, it is determined that there is a failure in the dual-core microcontroller MCU 1 shown in FIG. 1. Therefore, it is possible to solve the problem in which vacant regions disappear in both FIFOA 13 and FIFOB 14 for a short time due to a plurality of data items which are sequentially output from both high-performance CPUA 2 and CPUB 6, and thus two CPUA 2 and CPUB 6 are easily stalled or wait.

<<Configuration of Buffer Memory>>

FIG. 2 is a diagram illustrating a configuration of the bufferA 11 and bufferB 12 which are buffer memories included in the dual-core microcontroller MCU 1 according to the first embodiment of the present invention shown in FIG. 1.

Write data WD, a ready signal RDY, a command signal CMD, and an address signal A are supplied to the bufferA 11 and bufferB 12 from the CPUA bus 4 and the CPUB bus 8, and a clock signal CLK, a count enable signal CNE, a counter reset signal CNR, and a power-on reset signal RST are supplied thereto from the control unit 16.

The ready signal RDY, the command signal CMD, and the address signal A are supplied to a decoder (DEC) 1110. In response to the ready signal RDY with a high level "1" indicating that the command signal CMD is valid, the command signal CMD which is a write command, and the address signal A for accessing the bufferA 11 and bufferB 12, the decoder (DEC) 1110 generates a write enable signal WE with a high level "1".

The write enable signal WE generated from the decoder (DEC) 1110 is supplied to a flip-flop (FF) 1120 in response to rising of the clock CLK. In a case where an output signal of the flip-flop (FF) 1120 has a high level "1", and the count enable signal CNE has a high level "1", a buffer write enable signal BWE which is generated from an output of an AND circuit 1130 has a high level "1".

In a case where the buffer write enable signal BWE has a high level "1", the write data WD is stored in a flip-flop (FF) 1150 in response to rising of the clock signal CLK. The flip-flop (FF) 1150 generates a buffer output signal BO.

In a case where the buffer write enable signal BWE has a high level "1", a counter (CNT) 1160 counts the clock signal CLK. The counter (CNT) 1160 generates a buffer count signal BC.

The power-on reset signal RST and the counter reset signal CNR from the control unit 16 are logically summed by an OR circuit 1140, and the counter (CNT) 1160 is reset by an output of the OR circuit 1140.

In the dual-core microcontroller MCU 1 according to the first embodiment of the present invention shown in FIGS. 1 and 2, for example, addresses of the bufferA 11 and bufferB 12 which are buffer memories are fixed. However, for example, an address range from a start address to an end address may be set in an address setting register by the CPUA 2 and CPUB 6. Therefore, data to be written in the memoryA 3 and memoryB 7 with any memory addresses can be buffer-stored in the bufferA 11 and bufferB 12 by the decoder (DEC) 1110 decoding the address signal A in an address range set in the address setting register.

<<Operation of Buffer Memory>>

FIG. 3 is a diagram illustrating an operation of the bufferA 11 and bufferB 12 which are buffer memories shown in FIG. 2 included in the dual-core microcontroller MCU 1 according to the first embodiment of the present invention.

As shown in FIG. 3, the ready signal RDY with a high level "1" indicates that the command signal CMD is valid, and the ready signal RDY with a low level "0" indicates that the command signal CMD is invalid. The command signal CMD has three kinds of operations including N (No operation), R (Read; reading operation), and W (Write; writing operation). The address signal A is output from the CPUA 2 or the CPUB 6 to the CPUA bus 4 or the CPUB bus 8 at a clock cycle of the clock signal CLK in the same manner as the command signal CMD.

In the example shown in FIG. 3, in the first, second, seventh, ninth, and fourteenth clock signals CLK, the command signal CMD for a reading operation R is output from the CPUA 2 or the CPUB 6. In addition, an address signal A1, an address signal A2, an address signal A5, an address signal A6, and an address signal A9 are respectively output in the first, second, seventh, eighth, and fourteenth clock signals CLK from the CPUA 2 or the CPUB 6. Therefore, in the second, third, ninth, tenth, and fifteenth clock signals CLK, read data RD of data D1, data D2, data D5, data D6, and data D9 is read from the memoryA 3 or the memoryB 7 to the CPUA 2 or the CPUB 6 via the CPUA bus 4 or the CPUB bus 8.

Further, in the example shown in FIG. 3, in the fifth, sixth, tenth and thirteenth clock signals CLK, the command signal CMD for a writing operation W is output from the CPUA 2 or the CPUB 6. Furthermore, in the fifth, sixth, tenth and thirteenth clock signals CLK, an address signal A3, an address signal A4, an address signal A7, and an address signal A8 are respectively output from the CPUA 2 or the CPUB 6. Therefore, in the sixth, seventh and fourteenth clock signals CLK, write data WD of data D3, data D4, and data D8 is written in the memoryA 3 or the memoryB 7 and the bufferA 11 or the bufferB 12 from the CPUA 2 or the CPUB 6 via the CPUA bus 4 or the CPUB bus 8. In addition, the address signal A7 corresponding to the tenth duration of the clock signal CLK has addresses other than memory addresses for accessing the memoryA 3 or the memoryB 7 and the bufferA 11 or the bufferB 12. For example, the address signal A7 corresponding to the tenth duration of the clock signal CLK is used to access other devices such as a memory mapped I/O.

Accordingly, in response to the address signal A3, the address signal A4, and the address signal A8 other than the address signal A7 for accessing other devices, the decoder (DEC) 1110 generates the write enable signal WE with a high level "1" in the fifth and sixth durations of the clock signals CLK and the thirteenth duration of the clock signal CLK, respectively.

The flip-flop (FF) 1120 delays the write enable signal WE which is generated from an output of the decoder (DEC) 1110 by one clock of the clock signal CLK, and thus the buffer write enable signal BWE with a high level "1", delayed by one clock, is generated from an output of the AND circuit 1130.

As a result, in response to the buffer write enable signal BWE with a high level "1", write data WD of the data D3, the data D4 and the data D8 is stored in the flip-flop (FF) 1150, and thus the buffer output signal BO of the data D3, the data D4 and the data D8 is generated from an output of the flip-flop (FF) 1150. In addition, the counter (CNT) 1160 outputs a buffer count signal BC which is the number of outputs of the buffer output signal BO in response to the buffer write enable signal BWE with a high level "1" and the clock signal CLK.

<<Configuration of FIFO Memory>>

FIG. 4 is a diagram illustrating a configuration of the FIFOA 13 and FIFOB 14 which are FIFO memories included in the dual-core microcontroller MCU 1 according to the first embodiment of the present invention shown in FIG. 1.

As shown in FIG. 4, the FIFOA 13 and FIFOB 14 which are FIFO memories include four-stage flip-flops (FF) 1310, 1320, 1330 and 1340, a decoder (DEC) 1350, and a selector (SEL) 1360.

The buffer output signal BO generated from the bufferA 11 and bufferB 12 which are buffer memories shown in FIG. 2 is supplied to data input terminals of the four-stage flip-flops (FF) 1310 to 1340. A FIFO write enable signal FWE and a FIFO write number signal FWN are supplied to the decoder (DEC) 1350 from the control unit 16, and write enable signals WE0, WE1, WE2 and WE3 are generated from the decoder (DEC) 1350. Any one of a plurality of write enable signals WE0, WE1, WE2 and WE3 from the decoder (DEC) 1350 has a high level "1" at a rising timing of the clock signal CLK, and thus which of the four-stage flip-flops (FF) 1310, 1320, 1330 and 1340 stores the buffer output signal BO is selected.

A FIFO read number signal FRN is supplied to the selector (SEL) 1360 from the control unit 16, and one of output signals FO0, FO1, FO2 and FO3 of the flip-flops (FF) 1310, 1320, 1330 and 1340 having a number indicated by the FIFO read number signal FRN is selected as a FIFO output signal FO.

<<Operation of FIFO>>

FIG. 5 is a diagram illustrating an operation of the FIFOA 13 and FIFOB 14 which are FIFO memories shown in FIG. 4 included in the dual-core microcontroller MCU 1 according to the first embodiment of the present invention.

FIG. 5 shows that only the last one of four buffer output signals BO which are sequentially supplied to the FIFOA 13 and FIFOB 14 from the bufferA 11 and bufferB 12 is stored in the FIFOA 13 and FIFOB 14. In other words, only a data input signal D4 as the last one of data input signals D1, D2, D3 and D4 which are four sequentially supplied buffer output signals BO is stored in the FIFOA 13 and FIFOB 14, and then only a data input signal D8 as the last one of data input signals D5, D6, D7 and D8 which are four sequentially supplied buffer output signals BO is stored in the FIFOA 13 and FIFOB 14.

As shown in FIG. 5, the FIFO write number signal FWN and the FIFO read number signal FRN are initially set to an initial value "0" by the control unit 16. The FIFO write enable signal FWE is controlled so as to have a high level "1" by the control unit 16 at the rising timing of the eighth clock signal CLK, and thus the fourth data input signal D4 is stored in the first-stage flip-flop (FF) 1310 at the rising timing of the ninth clock signal CLK. At this time, since the FIFO read number signal FRN is set to the initial value "0", the output signal FO0 of the first-stage flip-flop (FF) 1310 is selected by the selector (SEL) 1360, and thus the fourth data input signal D4 is output as the FIFO output signal FO. On the other hand, in response to the fourth data input signal D4 being stored in the first-stage flip-flop (FF) 1310 at the rising timing of the ninth clock signal CLK, the control unit 16 changes the FIFO write number signal FWN from the initial value "0" to a subsequent updated value "1".

When the same fourth data input signal D4 is stored in both FIFOA 13 and FIFOB 14 which are FIFO memories, the comparator 15 of the dual-core microcontroller MCU 1 according to the first embodiment of the present invention shown in FIG. 1 compares the FIFO output signals FO of both FIFOA 13 and FIFOB 14 with each other. After the comparison is performed, the fourth data input signal D4 stored in both FIFOA 13 and FIFOB 14 becomes unnecessary. In the example shown in FIG. 5, the fourth data input signal D4 has already been stored in one of both FIFOA 13 and FIFOB 14 at the rising timing of the eighth clock signal CLK, the fourth data input signal D4 is stored in the other of both FIFOA 13 and FIFOB 14 at the rising timing of the eleventh clock signal CLK, and the comparator 15 compares the FIFO output signals FO of both FIFOA 13 and FIFOB 14 with each other. As a result, at the rising timing of the twelfth clock signal CLK and thereafter, a valid data input signal is not stored in the first-stage flip-flop (FF) 1310, and thus the FIFO output signal FO is undefined as indicated by the halftone dot meshing of FIG. 5. Further, in response to the comparator 15 comparing the FIFO output signals FO of both FIFOA 13 and FIFOB 14 with each other, the control unit 16 changes the FIFO read number signal FRN from the initial value "0" to a subsequent updated value "1".

In addition, as shown in FIG. 5, the FIFO write enable signal FWE is controlled so as to have a high level "1" by the control unit 16 at the rising timing of the thirteenth clock signal CLK, and thus the eighth data input signal D8 is stored in the second-stage flip-flop (FF) 1320 at the fourteenth rising timing of the clock signal CLK. The reason why the eighth data input signal D8 is stored in the second-stage flip-flop (FF) 1320 in this way is that the FIFO write number signal FWN is changed from the initial value "0" to the updated value "1" by the control unit 16. At this time, since the FIFO read number signal FRN is set to the updated value "1", the output signal FO1 of the second-stage flip-flop (FF) 1320 is selected by the selector (SEL) 1360, and thus the eighth data input signal D8 is output as the FIFO output signal FO.

<<Configuration of Comparator>>

Figure 6:
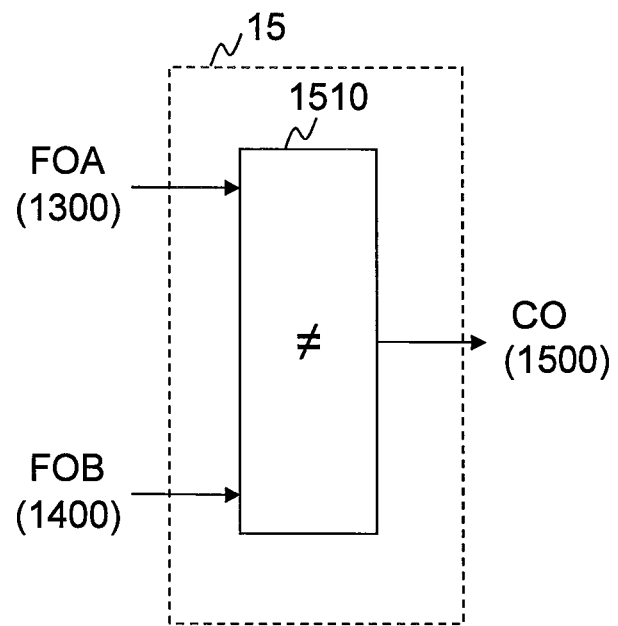
FIG. 6 is a diagram illustrating a configuration of a comparator 15 included in the dual-core microcontroller MCU 1 according to the first embodiment of the present invention shown in FIG. 1.

FIG. 6 is a diagram illustrating a configuration of the comparator 15 included in the dual-core microcontroller MCU 1 according to the first embodiment of the present invention shown in FIG. 1.

As shown in FIG. 6, the comparator 15 includes a digital comparator 1510, a FIFO output signal FOA (1300) of the FIFOA 13 and a FIFO output signal FOB (1400) of the FIFOB 14 are respectively supplied to one input terminal and the other input terminal of the digital comparator 1510, and a comparison output signal CO is generated from an output terminal of the digital comparator 1510. Therefore, in a case where the FIFO output signal FOA (1300) of the FIFOA 13 matches the FIFO output signal FOB (1400) of the FIFOB 14, the comparison output signal CO has a low level "1", whereas in a case where the FIFO output signal FOA (1300) of the FIFOA 13 does not match the FIFO output signal FOB (1400) of the FIFOB 14, the comparison output signal CO has a high level "1".

<<Operation of Comparator>>

Figure 7:
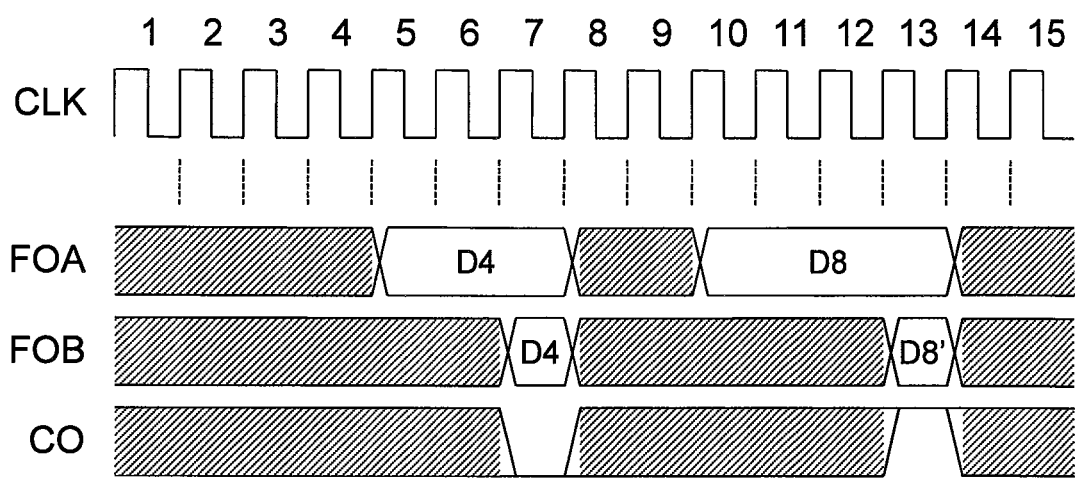
FIG. 7 is a diagram illustrating an operation of the comparator 15 shown in FIG. 6 included in the dual-core microcontroller MCU 1 according to the first embodiment of the present invention.

FIG. 7 is a diagram illustrating an operation of the comparator 15 shown in FIG. 6 included in the dual-core microcontroller MCU 1 according to the first embodiment of the present invention.

As shown in FIG. 7, as the FIFO output signal FOA (1300) of the FIFOA 13, the fourth data input signal D4 is output in the duration of the fifth to seventh clock signals CLK, and the eighth data input signal D8 is output in the duration of the tenth to thirteenth clock signals CLK, and the FIFO output signal FOA (1300) is undefined in other durations. On the other hand, as the FIFO output signal FOB (1400) of the FIFOB 14, the fourth data input signal D4 is output in the duration of the seventh clock signal CLK, and another eighth data input signal D8' (having a value different from the eighth data input signal D8) is output in the duration of the thirteenth clock signal CLK, and the FIFO output signal FOB (1400) is undefined in other durations.

As a result, the comparison output signal CO with a low level "0" (inputs of both match each other) is generated in the duration of the seventh clock signal CLK, the comparison output signal CO with a high level "1" (inputs of both do not match each other) is generated in the duration of the thirteenth clock signal CLK, and the comparison output signal CO is invalid in other durations.

<<Configuration of Control Unit>>

FIG. 8 is a diagram illustrating a configuration of the control unit 16 included in the dual-core microcontroller MCU 1 according to the first embodiment of the present invention shown in FIG. 1.

As shown in FIG. 8, the control unit 16 includes a decoder (DEC) 1614, a comparison control register (CCR0) 1610, a first comparison control register (CCR1) 1611, a second comparison control register (CCR2) 1612, a comparison state register (CSR) 1613, a 3-input AND circuit 1615, a 2-input AND circuit 1616, a first control portion (CTA) 1626, a second control portion (CTB) 1636, and the like.

Figure 9:
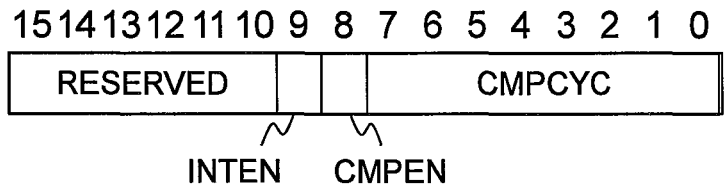
FIG. 9 is a diagram illustrating a configuration of a comparison control register (CCR0) 1610 shown in FIG. 8 included in the control unit 16 of the dual-core microcontroller MCU 1 according to the first embodiment of the present invention.

FIG. 9 is a diagram illustrating a configuration of the comparison control register (CCR0) 1610 shown in FIG. 8 included in the control unit 16 of the dual-core microcontroller MCU 1 according to the first embodiment of the present invention.

As shown in FIG. 9, bits 7 to 0 of the comparison control register (CCR0) 1610 indicate a comparison cycle CMPCYC, and sets how many buffer output signals BO of a plurality of buffer output signals BO which are sequentially generated from the bufferA 11 and bufferB 12 are held in the FIFOA 13 and FIFOB 14 and how many buffer output signals BO are compared with each other by the comparator 15. For example, in the comparison cycle CMPCYC of bits 7 to 0 of FIG. 9, H00 of all "0s" indicates a comparison cycle 256, and set values H01 to HFF which are values other than all "0s" indicate comparison cycles 1 to 255. In addition, a set value of the comparison cycle CMPCYC in the bits 7 to 0 of the comparison control register (CCR0) 1610 shown in FIG. 9 can be defined using a value of write data WD from the system bus 10.

A bit 8 of the comparison control register (CCR0) 1610 of FIG. 9 indicates a comparison enable signal CMPEN, and, for example, a low level "0" indicates comparison inhibition and a high level "1" indicates comparison permission. A bit 9 of the comparison control register (CCR0) 1610 of FIG. 9 indicates an interrupt enable signal INTEN, and, for example, a low level "0" indicates interrupt inhibition, and a high level "1" indicates interrupt permission. In addition, in FIG. 9, bits 15 to 10 of the comparison control register (CCR0) 1610 are reserved bits RESERVED.

Figure 10:
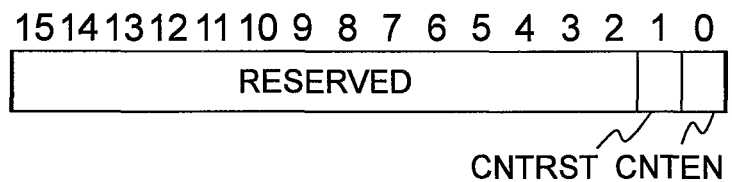
FIG. 10 is a diagram illustrating a configuration of a first comparison control register (CCR1) 1611 and a second comparison control register (CCR2) 1612 shown in FIG. 8 included in the control unit 16 of the dual-core microcontroller MCU 1 according to the first embodiment of the present invention.

FIG. 10 is a diagram illustrating a configuration of the first comparison control register (CCR1) 1611 and the second comparison control register (CCR2) 1612 shown in FIG. 8 included in the control unit 16 of the dual-core microcontroller MCU 1 according to the first embodiment of the present invention.

As shown in FIG. 10, a bit 0 indicates a count enable signal CNTEN, and the bit 0 sets whether or not output data of the CPUA 2 is held in the bufferA 11 and is counted in a case of the first comparison control register (CCR1) 1611 and sets whether or not output data of the CPUB 6 is held in the bufferB 12 and is counted in a case of the second comparison control register (CCR2) 1612. For example, holding and counting are not performed in a low level "0", and holding and counting are performed in a high level "1". In FIG. 10, a bit 1 indicates a count reset signal CNTRST, and a counter reset of the bufferA 11 is performed in a case of the first comparison control register (CCR1) 1611, and a counter reset of the bufferB 12 is performed in a case of the second comparison control register (CCR2) 1612. For example, a counter reset of the buffer is not performed in a low level "0", and a counter reset of the buffer is performed in a high level "1". Due to CNTRST, a written value is not held, and it is detected that a high level "1" is written so as to perform a counter reset of the bufferA 11 and the bufferB 12. In addition, also in FIG. 10, bits 15 to 2 are reserved bits RESERVED.

Figure 11:
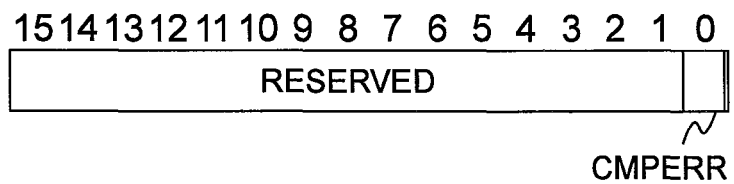
FIG. 11 is a diagram illustrating a configuration of a comparison state register (CSR) 1613 shown in FIG. 8 included in the control unit 16 of the dual-core microcontroller MCU 1 according to the first embodiment of the present invention.

FIG. 11 is a diagram illustrating a configuration of the comparison state register (CSR) 1613 shown in FIG. 8 included in the control unit 16 of the dual-core microcontroller MCU 1 according to the first embodiment of the present invention.

As shown in FIG. 11, a bit 0 of the comparison state register (CSR) 1613 indicates a comparison error signal CMPERR, and, for example, a low level "0" indicates that there is no comparison error (comparison result match), and a high level "1" indicates that there is a comparison error (comparison result mismatch). In addition, when a high level "1" (comparison result mismatch) is written as the comparison error signal CMPERR of the bit 0, a low level "0" (comparison result match) is not written in the bit 0 even if subsequent comparison results by the comparator 15 indicate match. Further, also in FIG. 11, bits 15 to 1 are reserved bits RESERVED.

Referring to FIG. 8 again, the ready signal RDY, the command signal CMD, and the address signal A of the system bus 10 are decoded by the decoder (DEC) 1614 so as to perform writing control of write data WD into the comparison control register (CCR0) 1610, the first comparison control register (CCR1) 1611, the second comparison control register (CCR2) 1612, and the comparison state register (CSR) 1613. Particularly, various write data items WD which are written into the comparison control register (CCR0) 1610, the first comparison control register (CCR1) 1611, the second comparison control register (CCR2) 1612, and the comparison state register (CSR) 1613 of the control unit 16 may be supplied from an on-chip built-in nonvolatile memory (not shown) of the dual-core microcontroller MCU 1 via the system bus 10, or may be supplied from an off-chip external nonvolatile memory (not shown) mounted on a main board via the system bus 10 and a direct memory access controller (DMAC).

In addition, although not shown in FIG. 8, a function of outputting read data RD to the system bus 10 may be added by performing reading control of the comparison control register (CCR0) 1610, the first comparison control register (CCR1) 1611, the second comparison control register (CCR2) 1612, and the comparison state register (CSR) 1613 to the system bus 10.

Further, the interrupt enable signal INTEN from the comparison control register (CCR0) 1610 and the comparison error signal CMPERR from the comparison state register (CSR) 1613 undergo logical product in the 2-input AND circuit 1616, and thus a comparison error interrupt signal C_INTREQ toward the interrupt generation circuit 17 is generated from the output of the 2-input AND circuit 1616. Furthermore, the first comparison control register (CCR1) 1611 generates a count enable signal CNEA and a counter reset signal CNRA supplied to the bufferA 11. In addition, the second comparison control register (CCR2) 1612 generates a count enable signal CNEB and a counter reset signal CNRB supplied to the bufferB 12.

Moreover, in the control unit 16 shown in FIG. 8, a register (FC0A) 1620, a register (FC1A) 1621, a register (FC2A) 1622, and a register (FC3A) 1623 which are FIFO counters hold data indicating what number data items of data items sequentially generated from the bufferA 11 are respectively stored in the flip-flop (FF) 1310, the flip-flop (FF) 1320, the flip-flop (FF) 1330, and the flip-flop (FF) 1340 of the FIFOA 13.

A register (FSTA) 1624 holds states (presence or absence of data) of the output signals FO0, FO1, FO2 and FO3 of the flip-flops (FF) 1310, 1320, 1330 and 1340 of the FIFOA 13. A register (FCNA) 1625 holds information indicating in what number the buffer output signal BO to be next held in the FIFOA 13 is generated from the bufferA 11. A control portion (CTA) 1626 controls the above-described registers 1620, 1621, 1622, 1623, 1624 and 1625. The control portion (CTA) 1626 receives the comparison enable signal CMPEN and the comparison cycle CMPCYC from the comparison control register (CCR0) 1610, and receives a buffer count signal BCA from the bufferA 11. First, when data is written in the comparison control register (CCR0) 1610, the comparison cycle CMPCYC is copied to the register (FCNA) 1625.

The control portion (CTA) 1626 compares the buffer count signal BCA with content of the register (FCNA) 1625, and, if both match each other, the buffer count signal BCA is stored in a register which is first shown not to include data by the register (FSTA) 1624 among the registers 1620, 1621, 1622 and 1623 which are FIFO counters. In addition, at the same time, the control portion (CTA) 1626 outputs a FIFO write enable signal FWEA and a FIFO write number signal FWNA to the FIFOA 13, and writes a buffer output signal BOA supplied from the bufferA 11 to the FIFOA 13. Further, the control portion (CTA) 1626 writes an addition value of a value of the buffer count signal BCA and a value of the comparison cycle CMPCYC at that time in the register (FCNA) 1625.

Moreover, in the control unit 16 shown in FIG. 8, a register (FC0B) 1630, a register (FC1B) 1631, a register (FC2B) 1632, and a register (FC3B) 1633 which are FIFO counters hold data indicating what number data items of data items sequentially generated from the bufferB 12 are respective stored in the flip-flop (FF) 1310, the flip-flop (FF) 1320, the flip-flop (FF) 1330, and the flip-flop (FF) 1340 of the FIFOB 14.

A register (FSTB) 1634 holds states (presence or absence of data) of the output signals FO0, FO1, FO2 and FO3 of the flip-flops (FF) 1310, 1320, 1330 and 1340 of the FIFOB 14. A register (FCNB) 1635 holds information indicating in what number the buffer output signal BO to be next held in the FIFOB 14 is generated from the bufferB 12. A control portion (CTB) 1636 controls the above-described registers 1630, 1631, 1632, 1633, 1634 and 1635. The control portion (CTB) 1636 receives the comparison enable signal CMPEN and the comparison cycle CMPCYC from the comparison control register (CCR0) 1610, and receives a buffer count signal BCB from the bufferB 12. First, when data is written in the comparison control register (CCR0) 1610, the comparison cycle CMPCYC is copied to the register (FCNB) 1635.

The control portion (CTB) 1636 compares the buffer count signal BCB with content of the register (FCNB) 1635, and, if both match each other, the buffer count signal BCB is stored in a register which is first shown not to include data by the register (FSTB) 1634 among the registers 1630, 1631, 1632 and 1633 which are FIFO counters. In addition, at the same time, the control portion (CTB) 1636 outputs a FIFO write enable signal FWEB and a FIFO write number signal FWNB to the FIFOB 14, and writes a buffer output signal BOB supplied from the bufferB 12 to the FIFOB 14. Further, the control portion (CTB) 1636 writes an addition value of a value of the buffer count signal BCB and a value of the comparison cycle CMPCYC at that time in the register (FCNB) 1635.

In a case where the FIFOA 13 is full of data, the buffer output signal BOA supplied from the bufferA 11 cannot be written in the FIFOA 13 even if the buffer count signal BCA is the same as content of the register (FCNA) 1625. On the other hand, when data is written in the FIFOA 13 and then the same data is written in the FIFOB 14, the comparator 15 performs comparison and thus vacancies occur in the FIFOA 13. The buffer count signal BCA at that time is written in a vacant FIFO counter, and an addition value of a value of the buffer count signal BCA and a value of the comparison cycle CMPCYC is written in the register (FCNA) 1625. In addition, the buffer output signal BOA at that time is written in the FIFOA 13.

Also in a case where the FIFOB 14 is full of data, writing cannot be performed in the same manner. If the FIFOB 14 is full in this way, the buffer output signal BO of a predetermined number in an order, which is output from the bufferB 12 and is an integer multiple of the comparison cycle CMPCYC which is set in the register (FCNA) 1635 in advance, cannot be written in the FIFOB 14. If writing of data into the FIFOB 14 is performed before the FIFOB 14 is full of data, and then writing of the same data into the FIFOA 13 is performed, comparison is performed by the comparator 15 and thus vacancies occur in the FIFOA 13 and the FIFOB 14. Therefore, finally, the buffer output signal BO from the bufferB 12 can be written in the FIFOB 14 at the vacancies of the FIFOB 14. As above, since writing of the buffer output signal BOB from the bufferB 12 for each integer multiple of the comparison cycle CMPCYC stops in the FIFOB 14, skipping of the number of the buffer output signals BOB to be written occurs. Accordingly, in a case where this skipping occurs, it is necessary for the FIFOB 14 to notify the FIFOA 13 of the occurrence of skipping. The FIFOA 13 which is notified of the occurrence of skipping updates content of the FIFO counter of the FIFOA 13 according to the skipping. In a case where skipping of the number of the buffer output signals BOA to be written in the FIFOA 13 occurs, it is necessary for the FIFOA 13 to notify the FIFOB 14 of the occurrence of skipping. The FIFOB 14 which is notified of the occurrence of skipping updates content of the FIFO counter of the FIFOA 13 according to the skipping. In other words, an internal signal 1627 is used for the FIFOA 13 to notify the FIFOB 14 of the occurrence of skipping, and an internal signal 1637 is used for the FIFOB 14 to notify the FIFOA 13 of the occurrence of skipping.

The control portion (CTA) 1626 sets a comparison enable signal CEA to a low level "0" when there is no valid data in the FIFOA 13, and sets the signal CEA to a high level "1" when there is valid data in the FIFOA 13. Similarly, the control portion (CTB) 1636 sets a comparison enable signal CEB to a low level "0" when there is no valid data in the FIFOB 14, and sets the signal CEB to a high level "1" when there is valid data in the FIFOB 14. If the comparison enable signal CEA and the comparison enable signal CEB have a high level "1", the comparison output signal CO of the comparator 15 is written in the comparison error signal CMPERR of the comparison state register (CSR) 1613 via the 3-input AND circuit 1615. The comparison error signal CMPERR of the comparison state register (CSR) 1613 may be cleared by writing a clear signal H0000 in the comparison state register (CSR) 1613.

Figure 12:
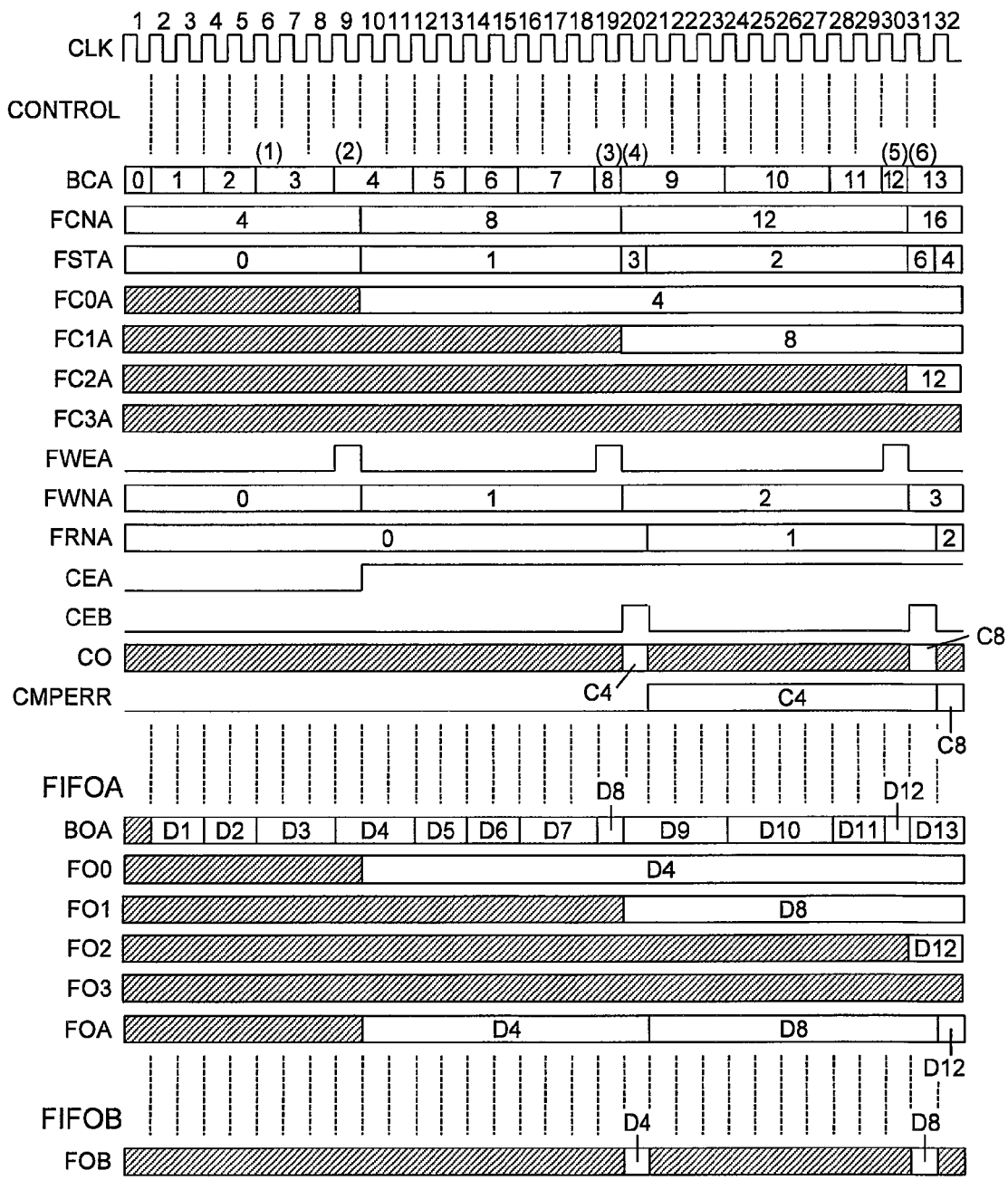
FIG. 12 is a diagram illustrating an operation of the FIFOA 13 and the FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOA 13.

FIG. 12 is a diagram illustrating an operation of the FIFOA 13 and FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOA 13.

Figure 13:
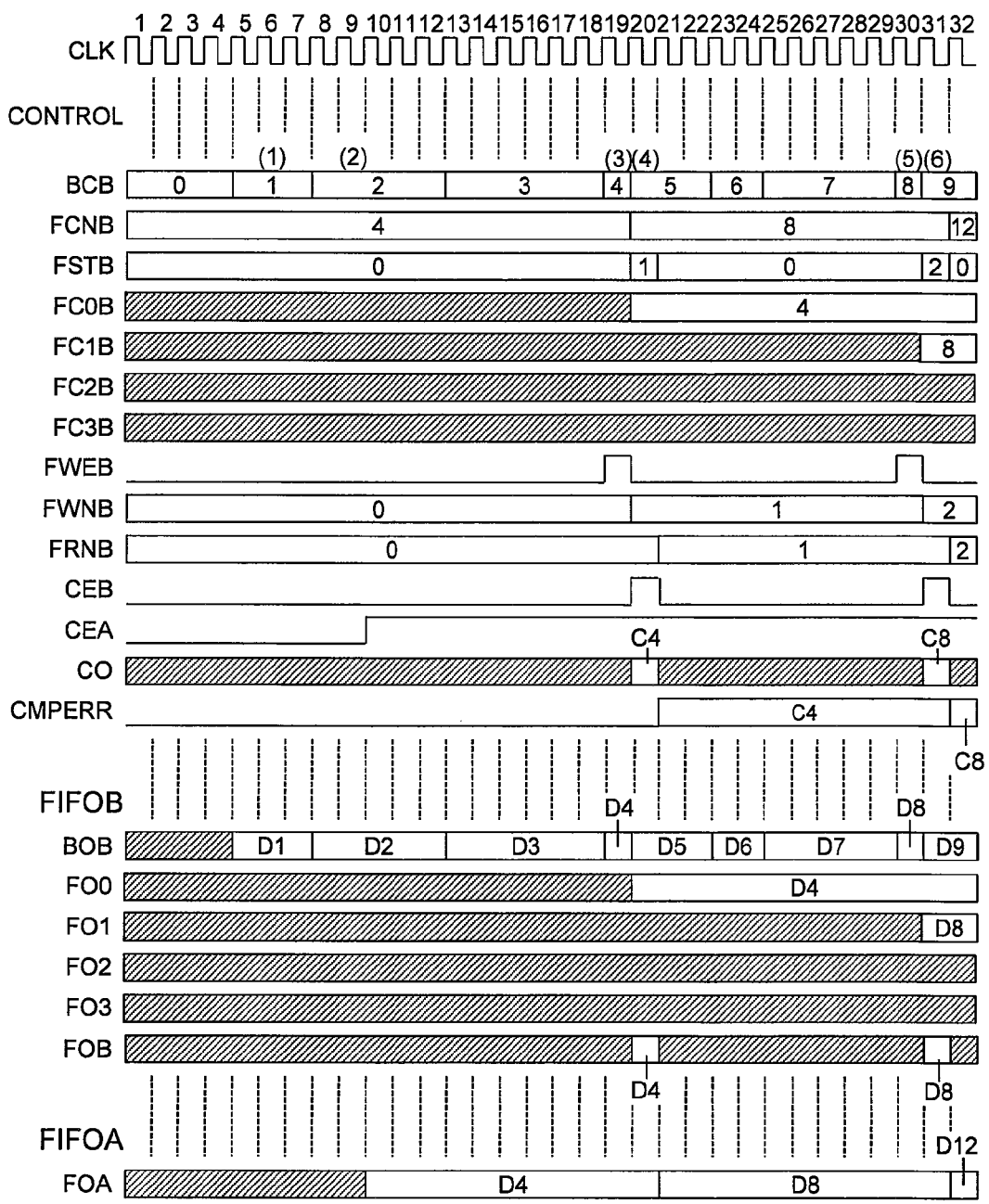
FIG. 13 is a diagram illustrating an operation of the FIFOA 13 and the FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOB 14.

FIG. 13 is a diagram illustrating an operation of the FIFOA 13 and the FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOB 14.

In the operation of FIG. 12 and the operation of FIG. 13, it is assumed that the comparison cycle CMPCYC indicated by the bits 7 to 0 of the comparison control register (CCR0) 1610 of the control unit 16 is set to a value "H04" as a predetermined initial value.

In FIG. 12, in the sixth clock signal CLK, a value of the buffer count signal BCA supplied from the bufferA 11 to the control portion (CTA) 1626 of the control unit 16 is "3", content of the register (FCNA) 1625 connected to the control portion (CTA) 1626 is "4", and content of the register (FSTA) 1624 is "H0 (data is absent)".

In the ninth clock signal CLK of FIG. 12, if a value of the buffer count signal BCA supplied from the bufferA 11 is "4", content of the register (FCNA) 1625 is "4", and thus they match each other, the value "4" of the buffer count signal BCA is written as content FC0A of the register (FC0A) 1620 connected to the control portion (CTA) 1626 at the timing of the next tenth clock signal CLK. In addition, at the timing of the tenth clock signal CLK, an addition value "8" of the value "4" of the buffer count signal BCA and the value "4" of the comparison cycle CMPCYC at this time is written in the register (FCNA) 1625, and content of the register (FSTA) 1624 is changed from "H0 (data is absent)" to "H1 (data is present in FO0)". Further, since the write enable signal FWEA which is supplied from the control portion (CTA) 1626 to the FIFOA 13 has a high level "1" at the timing of the ninth clock signal CLK, the buffer output signal BOA (=D4) supplied from the bufferA 11 is written as data FO0 of the first-stage flip-flop (FF) 1310 in the FIFOA 13. Since a value of the FIFO read number signal FRNA which is supplied from the control portion (CTA) 1626 to the FIFOA 13 is "0" at the timing of the ninth clock signal CLK, the data FO0 of the first-stage flip-flop (FF) 1310 is selected as read data FOA of the FIFOA 13, and the data D4 is output from the timing of the tenth clock signal CLK. In addition, the comparison enable signal CEA which is supplied from the control portion (CTA) 1626 to the 3-input AND circuit 1615 has a high level "1".

On the other hand, in FIG. 13, at the timing of the sixth clock signal CLK, a value of the buffer count signal BCB supplied from the bufferB 12 is "1", a value of the register (FCNB) 1635 is "4", and content of the register (FSTB) 1634 is "H0 (data is absent)". At the timing of the ninth clock signal CLK, a value of the buffer count signal BCB is "2", a value of the register (FCNB) 1635 is "4", and content of the register (FSTB) 1634 is "H0 (data is absent)".

Referring to FIG. 12 again, at the timing of the nineteenth clock signal CLK, if a value of the buffer count signal BCA supplied from the bufferA 11 is "8", content of the register (FCNA) 1625 is "8", and thus they match each other, the value "8" of the buffer count signal BCA is written as content FC1A of the register (FC1A) 1621 connected to the control portion (CTA) 1626 at the timing of the next twentieth clock signal CLK. In addition, at the timing of the twentieth clock signal CLK, an addition value "12" of the value "8" of the buffer count signal BCA and the value "4" of the comparison cycle CMPCYC at this time is written in the register (FCNA) 1625, and the content of the register (FSTA) 1624 is changed from "H1 (data is present in FO0)" to "H3 (data is present in FO0 and FO1)". Further, since the write enable signal FWEA which is supplied from the control portion (CTA) 1626 to the FIFOA 13 already has a high level "1" at the timing of the twentieth clock signal CLK, the buffer output signal BOA (=D8) supplied from the bufferA 11 is written as data FO1 of the second-stage flip-flop (FF) 1320 in the FIFOA 13.

On the other hand, in FIG. 13, at the timing of the nineteenth clock signal CLK, if a value of the buffer count signal BCB supplied from the bufferB 12 is "4", content of the register (FCNB) 1625 is "4", and thus they match each other, the value "4" of the buffer count signal BCB is written as content FC0B of the register (FC0B) 1630 connected to the control portion (CTB) 1636 at the timing of the next twentieth clock signal CLK. In addition, at the timing of the twentieth clock signal CLK, an addition value "8" of the value "4" of the buffer count signal BCB and the value "4" of the comparison cycle CMPCYC at this time is written in the register (FCNB) 1635, and the content of the register (FSTB) 1634 is changed from "H0 (data is absent)" to "H1 (data is present in FO0)". Further, since the write enable signal FWEB which is supplied from the control portion (CTB) 1636 to the FIFOB 14 has a high level "1" at the timing of the nineteenth clock signal CLK, the buffer output signal BOB (=D4) supplied from the bufferB 12 is written as data FO0 of the first-stage flip-flop (FF) 1310 in the FIFOB 14. Since a value of the FIFO read number signal FRNB which is supplied from the control portion (CTB) 1636 to the FIFOB 14 is "0" at the timing of the nineteenth clock signal CLK, the data FO0 of the first-stage flip-flop (FF) 1310 is selected as read data FOB of the FIFOB 14, and the data D4 is output from the timing of the twentieth clock signal CLK. In addition, the comparison enable signal CEB which is supplied from the control portion (CTB) 1636 to the 3-input AND circuit 1615 has a high level "1".

Returning to FIG. 12, since both of the comparison enable signal CEA and the comparison enable signal CEB have a high level "1" at the timing of the twentieth clock signal CLK, the comparison output signal CO (=C4), which indicates a comparison result signal 1500 of the comparator 15 which compares the FIFO output signal FOA (1300) of the FIFOA 13 with the FIFO output signal FOB (1400) of the FIFOB 14, has a valid value. Therefore, at the timing of the next twenty-first clock signal CLK, the comparison output signal CO (=C4) of the comparator 15 is written as the comparison error signal CMPERR of the comparison state register (CSR) 1613 via the 3-input AND circuit 1615. In addition, since the comparison between the FIFO output signal FOA (1300) and the FIFO output signal FOB (1400) which are the same data has been performed by the comparator 15, the first-stage flip-flop (FF) 1310 of the FIFOA 13 is vacant, and content of the register (FSTA) 1624 is changed from "1-13 (data is present in FO0 and FO1)" to "1-12 (data is present in FO1)". Further, since a value of the FIFO read number signal FRNA which is supplied from the control portion (CTA) 1626 to the FIFOA 13 is changed from "0" to "1" at the timing of the twenty-first clock signal CLK, the data FO1 (=D8) of the second-stage flip-flop (FF) 1320 is selected as read data FOA of the FIFOA 13.

On the other hand, in FIG. 13, since the comparison between the FIFO output signal FOA (1300) and the FIFO output signal FOB (1400) which are the same data has been performed by the comparator 15 at the timing of the twentieth clock signal CLK, the first-stage flip-flop (FF) 1310 (FO0) of the FIFOB 14 is vacant at the timing of the twenty-first clock signal CLK, and the content of the register (FSTB) 1634 is changed from "H1 (data is present in FO0)" to "H0 (data is absent)". In addition, since the value of the FIFO read number signal FRNB which is supplied from the control portion (CTB) 1636 to the FIFOB 14 is changed from "0" to "1", the data FO1 (undefined) of the second-stage flip-flop (FF) 1320 is selected as read data FOB of the FIFOB 14, and thus the FIFO output signal FOB (1400) of the FIFOB 14 is undefined at the timing of the twenty-first clock signal CLK.

Referring to FIG. 12 again, at the timing of the thirtieth clock signal CLK, if a value of the buffer count signal BCA supplied from the bufferA 11 is "12", content of the register (FCNA) 1625 is "12", and thus they match each other, the value "12" of the buffer count signal BCA is written as content FC2A of the register (FC2A) 1622 connected to the control portion (CTA) 1626 at the timing of the next thirty-first clock signal CLK. In addition, at the timing of the thirtieth clock signal CLK, an addition value "16" of the value "12" of the buffer count signal BCA and the value "4" of the comparison cycle CMPCYC at this time is written in the register (FCNA) 1625, and content of the register (FSTA) 1624 is changed from "H2 (data is present in FO1)" to "H6 (data is present in FO1 and FO2)". Further, since the write enable signal FWEA which is supplied from the control portion (CTA) 1626 to the FIFOA 13 already has a high level "1" at the timing of the thirtieth clock signal CLK, the buffer output signal BOA (=D12) supplied from the bufferA 11 is written as data FO2 of the third-stage flip-flop (FF) 1330 in the FIFOA 13. Furthermore, since a value of the FIFO read number signal FRNA which is supplied from the control portion (CTA) 1626 to the FIFOA 13 is changed from "1" to "2" at the timing of the thirty-second clock signal CLK, the data FO2 (=D12) of the third-stage flip-flop (FF) 1330 is selected as read data FOA of the FIFOA 13.

On the other hand, in FIG. 13, at the timing of the thirtieth clock signal CLK, if a value of the buffer count signal BCB supplied from the bufferB 12 is "8", content of the register (FCNB) 1625 is "8", and thus they match each other, the value "8" of the buffer count signal BCB is written as content FC1B of the register (FC1B) 1631 connected to the control portion (CTB) 1636 at the timing of the next thirty-first clock signal CLK. In addition, at the timing of the thirtieth clock signal CLK, an addition value "12" of the value "8" of the buffer count signal BCB and the value "4" of the comparison cycle CMPCYC at this time is written in the register (FCNB) 1635, and content of the register (FSTB) 1634 is changed from "H0 (data is absent)" to "H2 (data is present in FO1)". Further, since the write enable signal FWEB which is supplied from the control portion (CTB) 1636 to the FIFOB 14 has a high level "1" at the timing of the thirtieth clock signal CLK, the buffer output signal BOB (=D8) supplied from the bufferB 12 is written as data FO1 of the second-stage flip-flop (FF) 1320 in the FIFOB 14.

Returning to FIG. 12, since both of the comparison enable signal CEA and the comparison enable signal CEB have a high level "1" at the timing of the thirty-first clock signal CLK, the comparison output signal CO (=C8), which indicates a comparison result signal 1500 of the comparator 15 which compares the FIFO output signal FOA (1300) of the FIFOA 13 with the FIFO output signal FOB (1400) of the FIFOB 14, has a valid value. Therefore, at the timing of the next thirty-second clock signal CLK, the comparison output signal CO (=C8) of the comparator 15 is written as the comparison error signal CMPERR of the comparison state register (CSR) 1613 via the 3-input AND circuit 1615. In addition, since the comparison between the FIFO output signal FOA (1300) and the FIFO output signal FOB (1400) which are the same data has been performed by the comparator 15, the second-stage flip-flop (FF) 1320 of the FIFOA 13 is vacant, and content of the register (FSTA) 1624 is changed from "H6 (data is present in FO1 and FO2)" to "H4 (data is present in FO2)". Further, since a value of the FIFO read number signal FRNA which is supplied from the control portion (CTB) 1636 to the FIFOA 13 is changed from "1" to "2", the data FO2 (=D12) of the third-stage flip-flop (FF) 1330 is selected as read data FOA of the FIFOA 13, and thus the FIFO output signal FOA (1300) of the FIFOA 13 is the data D12 at the timing of the thirty-second clock signal CLK.

On the other hand, in FIG. 13, since the comparison between the FIFO output signal FOA (1300) and the FIFO output signal FOB (1400) which are the same data has been performed by the comparator 15 at the timing of the thirty-first clock signal CLK, the second-stage flip-flop (FF) 1320 of the FIFOB 14 is vacant, and the content of the register (FSTB) 1634 is changed from "H2 (data is present in FO1)" to "H0 (data is absent)". In addition, since the value of the FIFO read number signal FRNB which is supplied from the control portion (CTB) 1636 to the FIFOB 14 is changed from "1" to "2", the data FO2 (undefined) of the third-stage flip-flop (FF) 1330 is selected as read data FOB of the FIFOB 14, and thus the FIFO output signal FOB (1400) of the FIFOB 14 is undefined at the timing of the thirty-second clock signal CLK.

Figure 14:
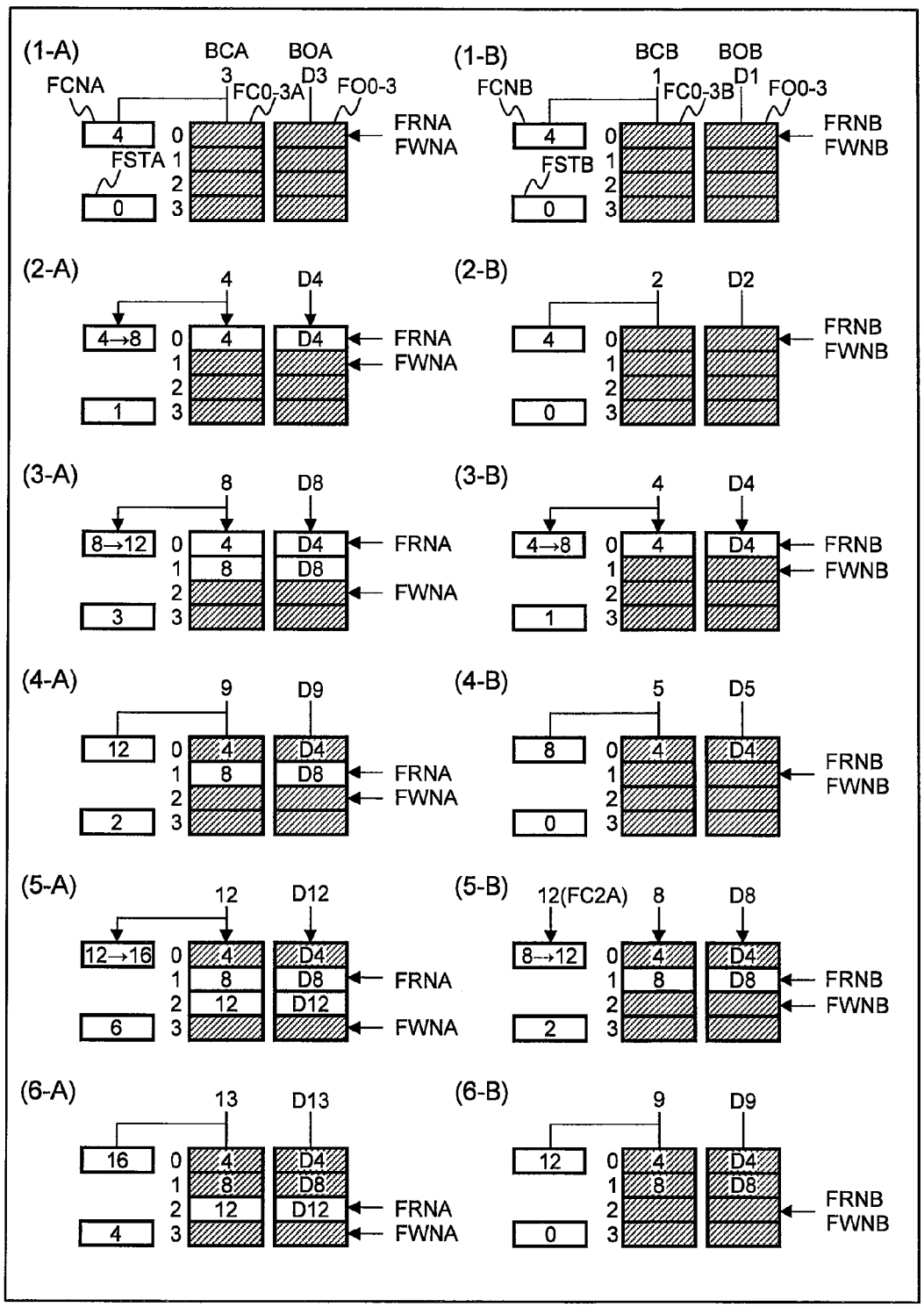
FIG. 14 is a diagram illustrating an operation of the FIFOA 13 and the FIFOB 14 at important timings of an operation timing chart of the FIFOA 13 and the FIFOB 14 shown in FIGS. 12 and 13 included in the dual-core microcontroller MCU 1 according to the first embodiment of the present invention shown in FIG. 1.

FIG. 14 is a diagram illustrating an operation of the FIFOA 13 and the FIFOB 14 at important timings of an operation timing chart of the FIFOA 13 and the FIFOB 14 shown in FIGS. 12 and 13 included in the dual-core microcontroller MCU 1 according to the first embodiment of the present invention shown in FIG. 1.

Partial diagrams (1-A) to (6-A) of FIG. 14 show an operation of the FIFOA 13 at timings including the timing (1), the timing (2), the timing (3), the timing (4), the timing (5) and the timing (6) of the operation timing chart of the FIFOA 13 and FIFOB 14 shown in FIGS. 12 and 13. Similarly, partial diagrams (1-B) to (6-B) of FIG. 14 show an operation of the FIFOB 14 at timings including the timing (1), the timing (2), the timing (3), the timing (4), the timing (5) and the timing (6) of the operation timing chart of the FIFOA 13 and FIFOB 14 shown in FIGS. 12 and 13.

In the partial diagram (1-A) of FIG. 14, content items of the register (FC0A) 1620, the register (FC1A) 1621, the register (FC2A) 1622, and the register (FC3A) 1623 of the FIFO counter, and content items of output signals FO0, FO1, FO2, and FO3 of the four-stage flip-flops (FF) 1310, 1320, 1330 and 1340 of the FIFOA 13 are all invalid, content of the register (FSTA) 1624 is "H0 (data is absent)", and content of the register (FCNA) 1625 is "4". Therefore, in the FIFOA 13 in a state shown in the partial diagram (1-A) of FIG. 14, a value of the buffer count signal BCA is "3", and thus data is not written in the FIFOA 13 even if the buffer output signal BOA (=D3) is supplied from the bufferA 11 to the FIFOA 13. At this time, the FIFO write number signal FWNA and the FIFO read number signal FRNA are initially set to an initial value "0" by the control unit 16.

In the partial diagram (1-B) of FIG. 14, content items of the register (FC0B) 1630, the register (FC1B) 1631, the register (FC2B) 1632, and the register (FC3B) 1633 of the FIFO counter, and content items of output signals FO0, FO1, FO2, and FO3 of the four-stage flip-flops (FF) 1310, 1320, 1330 and 1340 of the FIFOB 14 are all invalid, content of the register (FSTA) 1624 is "H0 (data is absent)", and content of the register (FCNB) 1635 is "4". Therefore, in the FIFOB 14 in a state shown in the partial diagram (1-B) of FIG. 14, a value of the buffer count signal BCB is "1", and thus data is not written in the FIFOB 14 even if the buffer output signal BOB (=D1) is supplied from the bufferB 12 to the FIFOB 14. At this time, the FIFO write number signal FWNB and the FIFO read number signal FRNB are initially set to an initial value "0" by the control unit 16.

In the partial diagram (2-A) of FIG. 14, since a value of the buffer count signal BCA and content of the register (FCNA) 1625 are "4", the value "4" of the buffer count signal BCA is written as content FC0A of the register (FC0A) 1620 of the FIFO counter, and the buffer output signal BOA (=D4) which is supplied from the bufferA 11 is written as the data FO0 of the first-stage flip-flop (FF) 1310 of the FIFOA 13. An addition value "8" of the value "4" of the buffer count signal BCA and the value "4" of the comparison cycle CMPCYC at this time is written in the register (FCNA) 1625, the content of the register (FSTA) 1624 is changed from "H0 (data is absent)" to "H1 (data is present in FO0)", and the value of the FIFO write number signal FWNA is changed from "0" to "1".

In the partial diagram (2-B) of FIG. 14, a value of the buffer count signal BCA is "2", and thus data is not written in the FIFOB 14 even if the buffer output signal BOB (=D2) is supplied from the bufferB 12 to the FIFOB 14.

In the partial diagram (3-A) of FIG. 14, since a value of the buffer count signal BCA and content of the register (FCNA) 1625 are "8", the value "8" of the buffer count signal BCA is written as content FC1A of the register (FC1A) 1621 of the FIFO counter, and the buffer output signal BOA (=D8) which is supplied from the bufferA 11 is written as the data FO1 of the second-stage flip-flop (FF) 1320 of the FIFOA 13. An addition value "12" of the value "8" of the buffer count signal BCA and the value "4" of the comparison cycle CMPCYC at this time is written in the register (FCNA) 1625, the content of the register (FSTA) 1624 is changed from "H1 (data is present in FO0)" to "H3 (data is present in FO0 and FO1)", and the value of the FIFO write number signal FWNA is changed from "1" to "2".

In the partial diagram (3-B) of FIG. 14, since a value of the buffer count signal BCB and content of the register (FCNB) 1635 are "4", the value "4" of the buffer count signal BCB is written as content FC0B of the register (FC0B) 1630 of the FIFO counter, and the buffer output signal BOB (=D4) which is supplied from the bufferB 12 is written as the data FO0 of the first-stage flip-flop (FF) 1310 of the FIFOB 14. An addition value "8" of the value "4" of the buffer count signal BCB and the value "4" of the comparison cycle CMPCYC is written in the register (FCNB) 1635, the content of the register (FSTB) 1624 is changed from "H0 (data is absent)" to "H1 (data is present in FO0)", and the value of the FIFO write number signal FWNB is changed from "0" to "1".

The partial diagram (4-A) of FIG. 14 shows a state in which the buffer output signal BOA (=D4) which is supplied from the bufferA 11 has been stored as the data FO0 of the first-stage flip-flop (FF) 1310 of the FIFOA 13, and a state in which the buffer output signal BOB (=D4) which is supplied from the bufferB 12 has been stored as the data FO0 of the first-stage flip-flop (FF) 1310 of the FIFOB 14. Therefore, since comparison between the FIFO output signal FOA and the FIFO output signal FOB which are the same data (=D4) has been performed by the comparator 15, the first-stage flip-flop (FF) 1310 of the FIFOA 13 is vacant (invalid), and the content of the register (FSTA) 1624 is changed from "H3 (data is present in FO0 and FO1)" to "1-12 (data is present in FO1)". In addition, since the value of the FIFO read number signal FRNA has been changed from "0" to "1", the data FO1 (=D8) of the second-stage flip-flop (FF) 1320 is selected as read data FOA of the FIFOA 13.

Also in the partial diagram (4-B) of FIG. 14, since comparison between the FIFO output signal FOA (1300) and the FIFO output signal FOB (1400) which are the same data (=D4) has been performed by the comparator 15, the first-stage flip-flop (FF) 1310 (FO0) of the FIFOB 14 is vacant (invalid), and the content of the register (FSTB) 1634 is changed from "H1 (data is present in FO0)" to "H0 (data is absent)". In addition, since the value of the FIFO read number signal FRNB has been changed from "0" to "1", the data FO1 (undefined) of the second-stage flip-flop (FF) 1320 is selected as read data FOB of the FIFOB 14.

In the partial diagram (5-A) of FIG. 14, when a value of the buffer count signal BCA and content of the register (FCNA) 1625 are "12", the value "12" of the buffer count signal BCA is written as content FC2A of the register (FC2A) 1622. An addition value "16" of the value "12" of the buffer count signal BCA and the value "4" of the comparison cycle CMPCYC at this time is written in the register (FCNA) 1625, the content of the register (FSTA) 1624 is changed from "1-12 (data is present in FO1)" to "H6 (data is present in FO1 and FO2)". Since the write enable signal FWEA has a high level "1", the buffer output signal BOA (=D12) supplied from the bufferA 11 is written as data FO2 of the third-stage flip-flop (FF) 1330 in the FIFOA 13. Since the value of the FIFO read number signal FRNA is changed from "0" to "1", the data FO1 (=D8) of the second-stage flip-flop (FF) 1320 is selected as read data FOA of the FIFOA 13. In addition, the value of the FIFO write number signal FWNA is changed from "2" to "3".

In the partial diagram (5-B) of FIG. 14, on the other hand, when a value of the buffer count signal BCB and content of the register (FCNB) 1635 are "8", the value "8" of the buffer count signal BCB is written as content FC1B of the register (FC1B) 1631. An addition value "12" of the value "8" of the buffer count signal BCB and the value "4" of the comparison cycle CMPCYC at this time is written in the register (FCNB) 1635, the content of the register (FSTB) 1634 is changed from "H0 (data is absent)" to "H2 (data is present in FO1)". Since the write enable signal FWEB has a high level "1", the buffer output signal BOB (=D8) supplied from the bufferB 12 is written as data FO1 of the second-stage flip-flop (FF) 1320 in the FIFOB 14. In addition, the value of the FIFO write number signal FWNB is changed from "1" to "2".

In the partial diagram (6-A) of FIG. 14, since comparison between the FIFO output signal FOA and the FIFO output signal FOB which are the same data (=D8) has been performed by the comparator 15, the second-stage flip-flop (FF) 1320 of the FIFOA 13 is vacant (invalid), and the content of the register (FSTA) 1624 is changed from "H6 (data is present in FO1 and FO2)" to "H4 (data is present in FO2)". In addition, since the value of the FIFO read number signal FRNA has been changed from "1" to "2", the data FO2 (=D12) of the third-stage flip-flop (FF) 1330 is selected as read data FOA of the FIFOA 13.

Also in the partial diagram (6-B) of FIG. 14, since comparison between the FIFO output signal FOA (1300) and the FIFO output signal FOB (1400) which are the same data (=D8) has been performed by the comparator 15, the second-stage flip-flop (FF) 1320 (FO1) of the FIFOB 14 is vacant (invalid), and the content of the register (FSTB) 1634 is changed from "H2 (data is present in FO1)" to "H0 (data is absent)". In addition, since the value of the FIFO read number signal FRNB has been changed from "1" to "2", the data FO2 (undefined) of the third-stage flip-flop (FF) 1330 is selected as read data FOB of the FIFOB 14.

Figure 15:
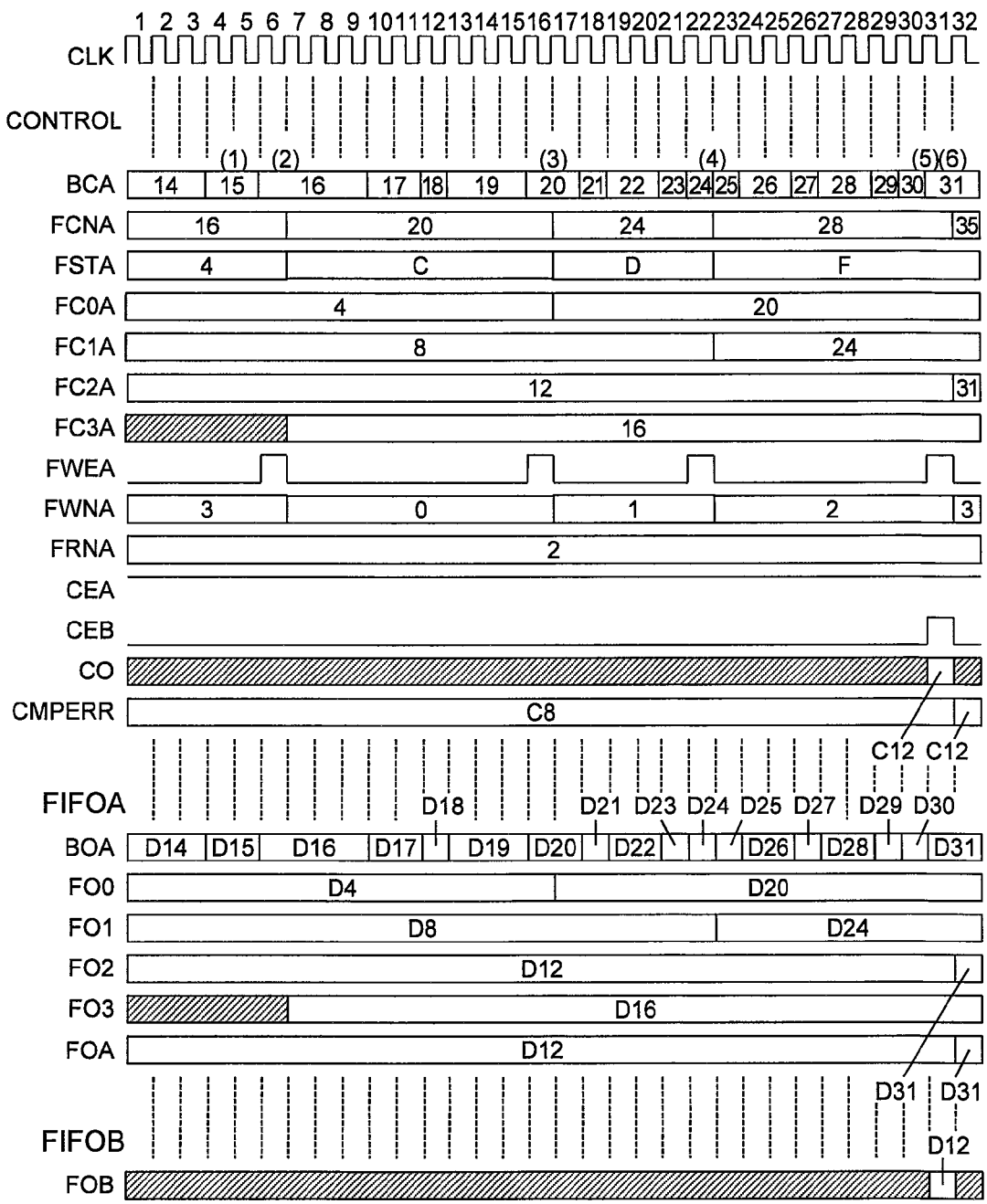
FIG. 15 is a diagram illustrating an operation of the FIFOA 13 and the FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOA 13.

FIG. 15 is a diagram illustrating an operation of the FIFOA 13 and the FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOA 13. FIG. 15 is an operation timing chart subsequent to the operation timing chart shown in FIG. 12.

Figure 16:
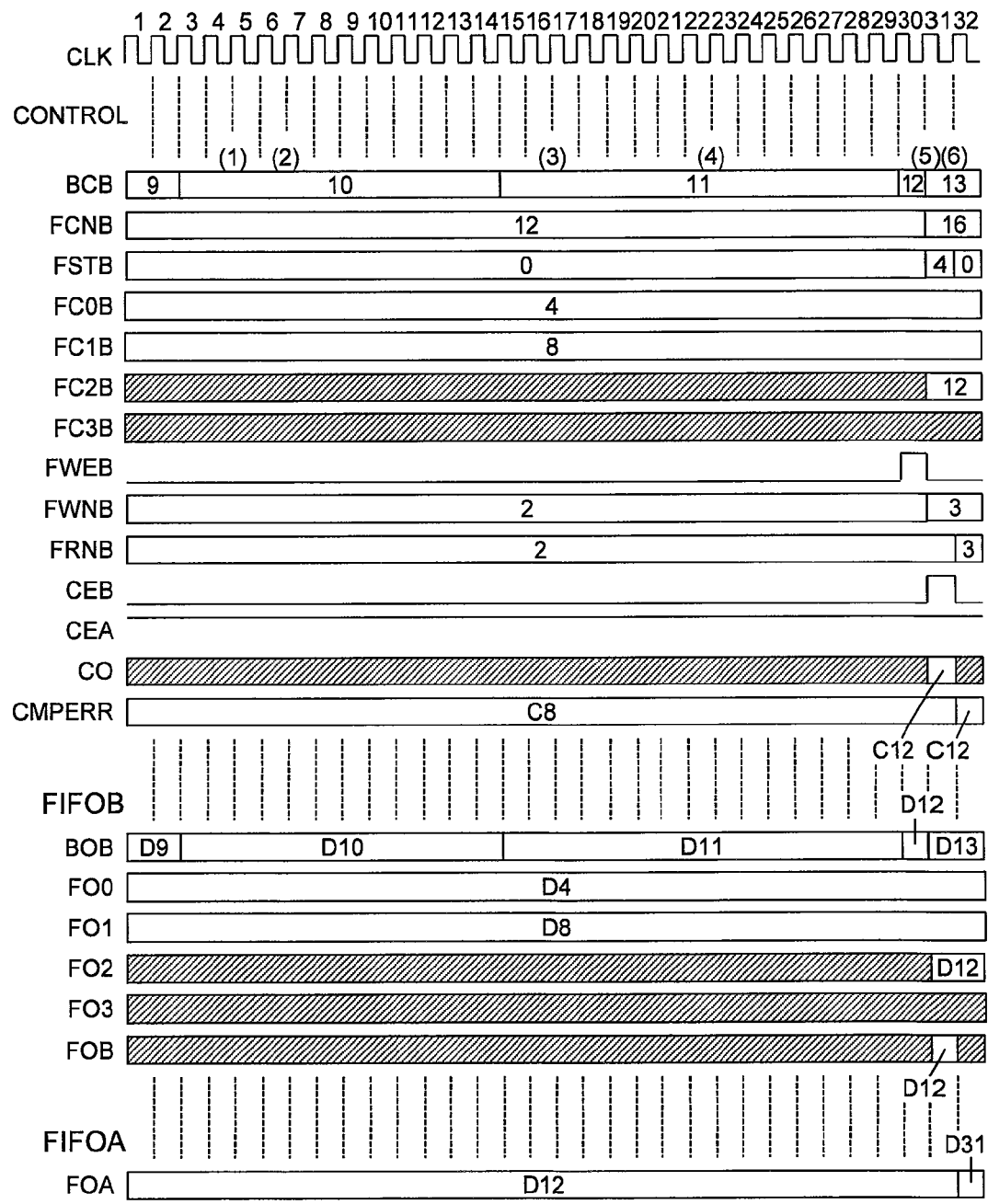
FIG. 16 is a diagram illustrating an operation of the FIFOA 13 and the FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOB 14.

FIG. 16 is a diagram illustrating an operation of the FIFOA 13 and the FIFOB 14 shown in FIG. 4 and an operation of the control unit 16 shown in FIG. 8, included in the dual-core microcontroller MCU 1 according to the first embodiment of the present invention shown in FIG. 1, with a focus on the FIFOB 14. FIG. 16 is an operation timing chart subsequent to the operation timing chart shown in FIG. 13.

In FIG. 15, in the fifth clock signal CLK, a value of the buffer count signal BCA supplied from the bufferA 11 to the control portion (CTA) 1626 of the control unit 16 is "15", content of the register (FCNA) 1625 connected to the control portion (CTA) 1626 is "16", and content of the register (FSTA) 1624 is "H4 (data is present in FC2)".

In the sixth clock signal CLK, if a value of the buffer count signal BCA supplied from the bufferA 11 is "16", content of the register (FCNA) 1625 is "16", and thus they match each other, the value "16" of the buffer count signal BCA is written as content FC3A of the register (FC3A) 1623 connected to the control portion (CTA) 1626 at the timing of the next seventh clock signal CLK. In addition, at the timing of the seventh clock signal CLK, an addition value "20" of the value "16" of the buffer count signal BCA and the value "4" of the comparison cycle CMPCYC at this time is written in the register (FCNA) 1625, and content of the register (FSTA) 1624 is "HC (data is present in FO2 and FO3)". Further, since the write enable signal FWEA which is supplied from the control portion (CTA) 1626 to the FIFOA 13 has a high level "1" at the timing of the sixth clock signal CLK, the buffer output signal BOA (=D16) supplied from the bufferA 11 is written as data FO3 of the fourth-stage flip-flop (FF) 1340 in the FIFOA 13. Since a value of the FIFO read number signal FRNA which is supplied from the control portion (CTA) 1626 to the FIFOA 13 is "2" at the timing of the sixth clock signal CLK, the data FO2 (=D12) of the third-stage flip-flop (FF) 1330 is selected as read data FOA of the FIFOA 13.

On the other hand, in FIG. 16, in the fifth clock signal CLK, a value of the buffer count signal BCB which is supplied from the bufferB 12 to the control portion (CTB) 1636 of the control unit 16 is "10", content of the register (FCNB) 1635 is "12", and content of the register (FSTB) 1634 is "H0 (data is absent)". Even in the next sixth clock signal CLK, and furthermore, even in the next seventh clock signal CLK, the state is not changed.

Referring to FIG. 15 again, in the sixteenth clock signal CLK, if a value of the buffer count signal BCA supplied from the bufferA 11 is "20", content of the register (FCNA) 1625 is "20", and thus they match each other, the value "20" of the buffer count signal BCA is written as content FC0A of the register (FC0A) 1620 connected to the control portion (CTA) 1626 at the timing of the next seventeenth clock signal CLK. In addition, at the timing of the seventeenth clock signal CLK, an addition value "24" of the value "20" of the buffer count signal BCA and the value "4" of the comparison cycle CMPCYC at this time is written in the register (FCNA) 1625, and content of the register (FSTA) 1624 is changed from "HC (data is present in FO2 and FO3)" to "HD (data is present in FO2, FO3, and FO0)". Further, since the write enable signal FWEA which is supplied from the control portion (CTA) 1626 to the FIFOA 13 already has a high level "1" at the timing of the sixteenth clock signal CLK, the buffer output signal BOA (=D20) supplied from the bufferA 11 is written as data FO0 of the first-stage flip-flop (FF) 1310 in the FIFOA 13.

On the other hand, in FIG. 16, in the sixteenth clock signal CLK, a value of the buffer count signal BCB which is supplied from the bufferB 12 to the control portion (CTB) 1636 of the control unit 16 is "11", content of the register (FCNB) 1635 is "12", and content of the register (FSTB) 1634 is "H0 (data is absent)".

Referring to FIG. 15 again, at the timing of the twenty-second clock signal CLK, if a value of the buffer count signal BCA supplied from the bufferA 11 is "24", content of the register (FCNA) 1625 is "24", and thus they match each other, the value "24" of the buffer count signal BCA is written as content FC1A of the register (FC1A) 1621 connected to the control portion (CTA) 1626 at the timing of the next twenty-third clock signal CLK. In addition, at the timing of the twenty-second clock signal CLK, an addition value "28" of the value "24" of the buffer count signal BCA and the value "4" of the comparison cycle CMPCYC at this time is written in the register (FCNA) 1625, and the content of the register (FSTA) 1624 is changed from "HD (data is present in FO2, FO3, and FO0)" to "HF (data is present in FO2, FO3, FO0, and FO1)". Further, since the write enable signal FWEA which is supplied from the control portion (CTA) 1626 to the FIFOA 13 already has a high level "1" at the timing of the twenty-first clock signal CLK, the buffer output signal BOA (=D24) supplied from the bufferA 11 is written as data FO1 of the second-stage flip-flop (FF) 1320 in the FIFOA 13.

On the other hand, in FIG. 16, in the twenty-second clock signal CLK, a value of the buffer count signal BCB which is supplied from the bufferB 12 to the control portion (CTB) 1636 of the control unit 16 is "11", content of the register (FCNB) 1635 is "12", and content of the register (FSTB) 1634 is "H0 (data is absent)".

Referring to FIG. 15 again, in the twenty-seventh clock signal CLK, a value of the buffer count signal BCA supplied from the bufferA 11 is "28", content of the register (FCNA) 1625 is "28", and thus they match each other. However, since there is no vacancy in the FIFOA 13, the value "28" of the buffer count signal BCA and the buffer output signal BOA (=D28) are not written.

On the other hand, in FIG. 16, at the timing of the thirtieth clock signal CLK, if a value of the buffer count signal BCB which is supplied from the bufferB 12 to the control portion (CTB) 1636 of the control unit 16 is "12", content of the register (FCNB) 1635 is "12", and thus they match each other, the value "12" of the buffer count signal BCB is written as content FC2B of the register (FC2B) 1632 connected to the control portion (CTB) 1636 at the timing of the next thirty-first clock signal CLK. In addition, at the timing of the thirtieth clock signal CLK, an addition value "16" of the value "12" of the buffer count signal BCB and the value "4" of the comparison cycle CMPCYC at this time is written in the register (FCNB) 1635, and the content of the register (FSTB) 1634 is changed from "H0 (data is absent)" to "H4 (data is present in FO2)". Further, since the write enable signal FWEB which is supplied from the control portion (CTA) 1626 to the FIFOB 14 already has a high level "1" at the timing of the twenty-ninth clock signal CLK, the buffer output signal BOB (=D12) supplied from the bufferB 12 is written as data FO2 of the third-stage flip-flop (FF) 1330 in the FIFOB 14.

Since the comparison enable signal CEA and the comparison enable signal CEB have a high level "1" in the thirtieth clock signal CLK, the comparison output signal CO (=C12), which indicates a comparison result signal 1500 of the comparator 15 which compares the FIFO output signal FOA (1300) of the FIFOA 13 with the FIFO output signal FOB (1400) of the FIFOB 14, has a valid value. Therefore, in the thirty-first clock signal CLK, the comparison output signal CO (=C12) of the comparator 15 is written as the comparison error signal CMPERR of the comparison state register (CSR) 1613 via the 3-input AND circuit 1615. In addition, since the comparison between the FIFO output signal FOA (1300) and the FIFO output signal FOB (1400) which are the same data (D12) has been performed by the comparator 15, the third-stage flip-flop (FF) 1330 of the FIFOB 14 is vacant, and the content of the register (FSTB) 1634 is changed from "H4 (data is present in FO2)" to "H0 (data is absent)". Further, since a value of the FIFO read number signal FRNB which is supplied from the control portion (CTB) 1636 to the FIFOB 14 is changed from "2" to "3" at the timing of the thirty-first clock signal CLK, the data FO3 (undefined) of the fourth-stage flip-flop (FF) 1340 is selected as read data FOB of the FIFOB 14.

Referring to FIG. 15 again, since the comparison has been performed by the comparator 15 in the thirtieth clock signal CLK, a vacancy occurs in the third-stage flip-flop (FF) 1330 of the FIFOA 13 in the thirty-first clock signal CLK. A value of the buffer count signal BCA supplied from the bufferA 11 is "31" in the thirty-second clock signal CLK, and the value "31" of the buffer count signal BCA is written as content FC2A of the register (FC2A) 1622 connected to the control portion (CTA) 1626 at the timing of the next thirty-first clock signal CLK. In addition, at the timing of the thirtieth clock signal CLK, an addition value "35" of the value "31" of the buffer count signal BCA and the value "4" of the comparison cycle CMPCYC at this time is written in the register (FCNA) 1625, and content of the register (FSTA) 1624 is maintained at the value "HF (data is present in FO2, FO3, FO0, and FO1)". Since a value of the FIFO read number signal FRNA which is supplied from the control portion (CTB) 1636 to the FIFOA 13 is set to "2" at the timing of the thirty-second clock signal CLK, the data FO2 (=D31) of the third-stage flip-flop (FF) 1330 is selected as read data FOA of the FIFOA 13, and the FIFO output signal FOA (1300) of the FIFOA 13 is the data D31 at the timing of the thirty-second clock signal CLK.

Figure 17:
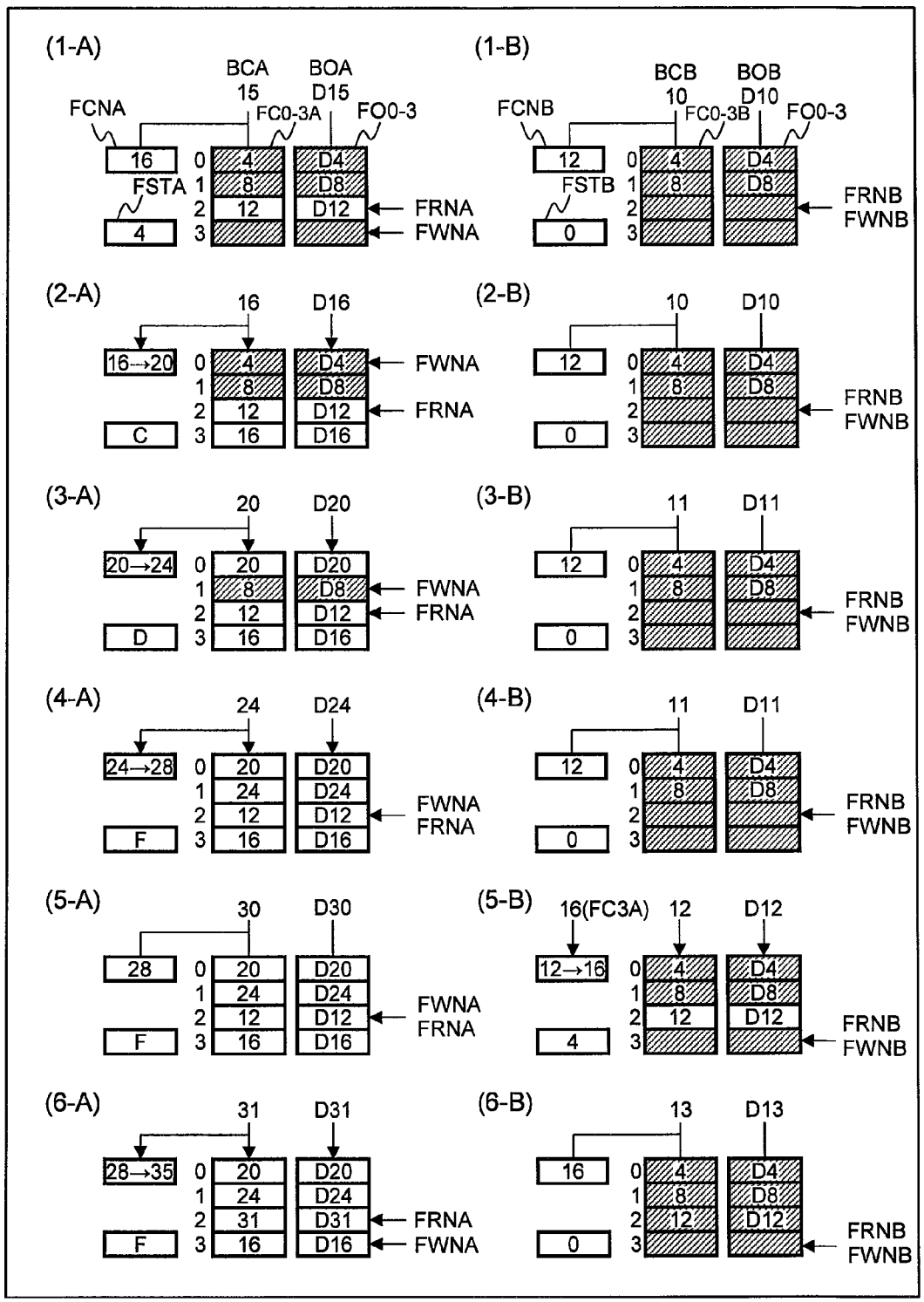
FIG. 17 is a diagram illustrating an operation of the FIFOA 13 and the FIFOB 14 at important timings of an operation timing chart of the FIFOA 13 and the FIFOB 14 shown in FIGS. 15 and 16 included in the dual-core microcontroller MCU 1 according to the first embodiment of the present invention shown in FIG. 1.

FIG. 17 is a diagram illustrating an operation of the FIFOA 13 and the FIFOB 14 at important timings of an operation timing chart of the FIFOA 13 and the FIFOB 14 shown in FIGS. 15 and 16 included in the dual-core microcontroller MCU 1 according to the first embodiment of the present invention shown in FIG. 1.

Partial diagrams (1-A) to (6-A) of FIG. 17 show an operation of the FIFOA 13 at timings including the timing (1), the timing (2), the timing (3), the timing (4), the timing (5), and the timing (6) of the operation timing chart of the FIFOA 13 and FIFOB 14 shown in FIGS. 15 and 16. Similarly, partial diagrams (1-B) to (6-B) of FIG. 17 show an operation of the FIFOB 14 at timings including the timing (1), the timing (2), the timing (3), the timing (4), the timing (5), and the timing (6) of the operation timing chart of the FIFOA 13 and FIFOB 14 shown in FIGS. 15 and 16.

In the partial diagram (1-A) of FIG. 17, a value of the buffer count signal BCA which is supplied from the bufferA 11 to the control portion (CTA) 1626 of the control unit 16 is "15", content of the register (FCNA) 1625 connected to the control portion (CTA) 1626 is "16", content of the register (FC2A) 1622 which is a FIFO counter is "12", data FO2 (=D12) of the second-stage flip-flop (FF) 1330 is valid, and other registers (FC0A) 1620, (FC1A) 1621, and (FC3A) 1623, and other flip-flops (FF) 1310, 1320, and 1340 are invalid. At this time, content of the register (FSTA) 1624 is "H4 (data is present in FO2)", a value of the FIFO read number signal FRNA is "2 (FO2)", and a value of the FIFO write number signal is "3 (FO3)".

In the partial diagram (1-B) of FIG. 17, content items of the register (FC0B) 1630, the register (FC1B) 1631, the register (FC2B) 1632, and the register (FC3B) 1633 of the FIFO counter, and content items of FIFO output signals FO0, FO1, FO2, and FO3 of the four-stage flip-flops (FF) 1310, 1320, 1330 and 1340 of the FIFOB 14 are all invalid, content of the register (FSTA) 1624 is "H0 (data is absent)", and content of the register (FCNB) 1635 is "12". Therefore, in the FIFOB 14 in a state shown in the partial diagram (1-B) of FIG. 17, a value of the buffer count signal BCA is "10", and thus data is not written in the FIFOB 14 even if the buffer output signal BOB (=D10) is supplied from the bufferB 12 to the FIFOB 14. At this time, the FIFO write number signal FWNB and the FIFO read number signal FRNB are set to a value "2 (FO2)" by the control unit 16.

In the partial diagram (2-A) of FIG. 17, since a value of the buffer count signal BCA and content of the register (FCNA) 1625 are "16", the value "16" of the buffer count signal BCA is written in the register (FC3A) 1623, and the buffer output signal BOA (=D16) which is supplied from the bufferA 11 is written as the data FO3 of the fourth-stage flip-flop (FF) 1340 in the FIFOA 13. An addition value "20" of the value "16" of the buffer count signal BCA and the value "4" of the comparison cycle CMPCYC at this time is written in the register (FCNA) 1625, the content of the register (FSTA) 1624 is updated from "H4 (data is present in FO2)" to "HC (data is present in FO2 and FO3)". In addition, the value of the FIFO write number signal FWNA is updated from "3" to "0", and the value of the FIFO read number signal FRNA is maintained at "2 (FO2)".

In the partial diagram (2-B) of FIG. 17, a value of the buffer count signal BCB is "10", and the buffer output signal BOB (=D10) supplied from the bufferB 12 is not written in the FIFOB 14.

In the partial diagram (3-A) of FIG. 17, since a value of the buffer count signal BCA supplied from the bufferA 11 is "20", content of the register (FCNA) 1625 is "20", and thus they match each other, and the value "20" of the buffer count signal BCA is written as content FC0A of the register (FC0A) 1620. Then, the buffer output signal BOA (=D20) is written as data FO0 of the first-stage flip-flop (FF) 1310. An addition value "24" of the value "20" of the buffer count signal BCA and the value "4" of the comparison cycle CMPCYC is written in the register (FCNA) 1625, and the content of the register (FSTA) 1624 is changed from "HC (data is present in FO2 and FO3)" to "HD (data is present in FO2, FO3, and FO0)". Further, the value of the FIFO write number signal FWNA is updated from "0" to "1".

In the partial diagram (3-B) of FIG. 17, a value of the buffer count signal BCB which is supplied from the bufferB 12 to the control portion (CTB) 1636 of the control unit 16 is "11", content of the register (FCNB) 1635 is "12", and content of the register (FSTB) 1634 is "H0 (data is absent)". Therefore, the buffer output signal BOB (=D11) supplied from the bufferB 12 is not written in the FIFOB 14.

In the partial diagram (4-A) of FIG. 17, since a value of the buffer count signal BCA supplied from the bufferA 11 is "24" and content of the register (FCNA) 1625 is "24", they match each other, and thus, the value "24" of the buffer count signal BCA is written as content FC1A of the register (FC0A) 1621. In addition, an addition value "28" of the value "24" of the buffer count signal BCA and the value "4" of the comparison cycle CMPCYC is written in the register (FCNA) 1625, and the buffer output signal BOA (=D24) supplied from the bufferA 11 is written as data FO1 of the second-stage flip-flop (FF) 1320. Further, the content of the register (FSTA) 1624 is changed from "HD (data is present in FO2, FO3, and FO0)" to "HF (data is present in FO2, FO3, FO0, and FO1)", and the value of the FIFO write number signal FWNA is updated from "1" to "2".

In the partial diagram (4-B) of FIG. 17, a value of the buffer count signal BCB which is supplied from the bufferB 12 to the control portion (CTB) 1636 of the control unit 16 is "11", content of the register (FCNB) 1635 is "12", and content of the register (FSTB) 1634 is "H0 (data is absent)". Therefore, the buffer output signal BOB (=D11) supplied from the bufferB 12 is not written in the FIFOB 14.

In the partial diagram (5-A) of FIG. 17, a value of the buffer count signal BCB which is supplied from the bufferB 12 to the control portion (CTB) 1636 of the control unit 16 is "30" and thus exceeds the value "28" of the register (FCNA) 1625, but a vacancy is not present in any of the flip-flops (FF) 1310, 1320, 1330 and 1340 of the FIFOA 13. Therefore, the buffer output signal BOA (=D30) supplied from the bufferA 11 is not written in the FIFOA 13.

In the partial diagram (5-B) of FIG. 17, since a value of the buffer count signal BCB which is supplied from the bufferB 12 to the control portion (CTB) 1636 of the control unit 16 is "12", content of the register (FCNB) 1635 is "12", and thus they match each other, the value "12" of the buffer count signal BCB is written as content FC2B of the register (FC2B) 1632. In addition, an addition value "16" of the value "12" of the buffer count signal BCB and the value "4" of the comparison cycle CMPCYC at this time is written in the register (FCNB) 1635, and the content of the register (FSTB) 1634 is changed from "H0 (data is absent)" to "H4 (data is present in FO2)". The buffer output signal BOB (=D12) supplied from the bufferB 12 is written as data FO2 of the third-stage flip-flop (FF) 1330 in the FIFOB 14. In addition, the value of the FIFO write number signal FWNB and the value of the FIFO read number signal FRNB are updated from "2" to "3".

In the partial diagram (6-A) of FIG. 17, since a vacancy occurs in the third-stage flip-flop (FF) 1330 of the FIFOA 13, the value "31" of the buffer count signal BCA supplied from the bufferA 11 is written as content FC2A of the register (FC2A) 1622 connected to the control portion (CTA) 1626. In addition, the buffer output signal BOA (=D31) supplied from the bufferA 11 is written as data FO2 of the third-stage flip-flop (FF) 1330. Further, an addition value "35" of the value "31" of the buffer count signal BCA and the value "4" of the comparison cycle CMPCYC at this time is written in the register (FCNA) 1625, and content of the register (FSTA) 1624 is maintained at the value "HF (data is present in FO2, FO3, FO0, and FO1)". The value of the FIFO read number signal FRNA is maintained at "2", and the value of the FIFO write number signal FWNA is updated from "2" to "3".

In the partial diagram (6-B) of FIG. 17, since the content of the register (FSTB) 1634 is changed to "H0 (data is absent)", the output signals FO0, FO1, FO2 and FO3 of the four-stage flip-flops (FF) 1310, 1320, 1330 and 1340 of the FIFOB 14 are all invalid, and the value of the FIFO read number signal FRNB and the value of the FIFO write number signal FWNB are updated from "2" to "3".

<<Transfer from Parallel Data Process in Normal Operation to Redundant Operation for Failure Detection Operation>>

FIG. 18 is a diagram illustrating a state in which transfer is performed from a parallel data process performed by two CPUA 2 and CPUB 6 in a normal operation of the dual-core microcontroller MCU 1 to a redundant operation performed by the two CPUA 2 and CPUB 6 for a failure detection operation in the first embodiment of the present invention shown in FIG. 1.

As shown in FIG. 18, in a parallel data process performed by the two CPUA 2 and CPUB 6 in a normal operation of the dual-core microcontroller MCU 1 according to the first embodiment of the present invention shown in FIG. 1, the CPUA 2 executes an individual task 200, and the CPUB 6 executes an individual task 600, and the task 200 is different from the task 600.

Next, the CPUA 2 performs a redundant task starting process 201 in order to execute a redundant task 203 for a failure detection operation. Starting of a redundant task 603 for a failure detection operation of the CPUB 6 may be realized, for example, using an interrupt process to the CPUB 6 from the CPUA 2.

In an execution preparing process 202 after the redundant task starting process 201, the CPUA 2 writes a set value "H0003" in the comparison control register (CCR1) 1611, and supplies the counter reset signal CNTRST and count enable signal CNTEN to the bufferA 11. In other words, as shown in FIG. 10, a counter reset of the bufferA 11 is performed by the counter reset signal CNTRST, and output data of the CPUA 2 is held in the bufferA 11 and is counted by the count enable signal CNTEN. Subsequently, the CPUA 2 writes a set value "H0304" in the comparison control register (CCR0) 1610, sets a set value "1" in the interrupt permission signal INTEN in relation to a failure detection operation of the comparator 15, sets a set value "1" in the comparison enable signal CMPEN in relation to comparison permission, and sets a set value "4" in the comparison cycle CMPCYC in relation to a comparison cycle.

On the other hand, the CPUB 6 receives an interrupt 204 from the CPUA 2 during the execution of the individual task 600 so as to perform an execution preparing process 602. In an execution preparing process 602, the CPUB 6 writes a set value "H0003" in the comparison control register (CCR2) 1612, and supplies the counter reset signal CNTRST and count enable signal CNTEN to the bufferB 12. In other words, as shown in FIG. 10, a counter reset of the bufferB 12 is performed by the counter reset signal CNTRST, and output data of the CPUB 6 is held in the bufferB 12 and is counted by the count enable signal CNTEN.

When preparation for execution of a redundant operation performed by the two CPUA 2 and CPUB 6 is completed through the execution preparing processes 202 and 602, both CPUA 2 and CPUB 6 respectively execute redundant tasks 203 and 603 for a failure detection operation. In other words, the two CPUA 2 and CPUB 6 execute the same redundant task program on the same operand data. Data items having a predetermined number of outputs which are selected by the two FIFOA 13 and FIFOB 14 are compared with each other by the comparator 15. In a case where a comparison result by the comparator 15 indicates match, it is determined that there is no failure in the dual-core microcontroller MCU 1 of FIG. 1, and, in a case where the comparison result by the comparator 15 indicates mismatch, it is determined that there is a failure in the dual-core microcontroller MCU 1 of FIG. 1. Further, in a case where the comparison result by the comparator 15 indicates mismatch, the control unit 16 generates the interrupt request signal 1604 (C_INTREQ) to the interrupt generation circuit 17 in response to the comparison result signal 1500 (CO) of the comparator 15. Therefore, an exception process is started, in which a notification indicating that a failure occurs in the dual-core microcontroller MCU 1 according to the first embodiment of the present invention shown in FIG. 1 and one of both CPUA 2 and CPUB 6 is abnormally operated is sent, in response to the interrupt request signal 1604 (C_INTREQ) by the interrupt generation circuit 17. This exception process is to notify of the failure occurrence of the dual-core microcontroller MCU 1, for example, by using a display apparatus of a dashboard on a driver's seat of an automobile. Therefore, an owner of the automobile can recognize that maintenance or repair of the automobile equipped with the dual-core microcontroller MCU 1 of which the notification of the failure occurrence has been sent is required to be performed.

When the execution of the redundant task 203 by the CPUA 2 is completed, the CPUA 2 is transferred to execution of the next task. On the other hand, when the execution of the redundant task 603 by the CPUB 6 is completed, the CPUB 6 performs interrupt return so as to return to the original individual task 600.

In addition, in the present invention, transfer to a redundant operation by both CPUA 2 and CPUB 6 for a failure detection operation is not limited to the above-described reception of the interrupt 204. In an initialization sequence when the dual-core microcontroller MCU 1 according to the first embodiment of the present invention shown in FIG. 1 is powered on, a redundant operation by both CPUA 2 and CPUB 6 for a failure detection operation may be performed. In other words, a redundant operation is performed by both CPUA 2 and CPUB 6, and it is determined that there is no failure in the dual-core microcontroller MCU 1, and then a parallel data process of both CPUA 2 and CPUB 6 in a normal operation is started for the first time. Further, after the parallel data process of both CPUA 2 and CPUB 6 in a normal operation is started, a command or an interrupt for starting a redundant operation may be periodically issued from either one of both CPUA 2 and CPUB 6 such that both CPUA 2 and CPUB 6 periodically perform a redundant operation for a failure detection operation. For the failure detection operation at this time, content of the redundant operation performed by the CPUA 2 and CPUB 6 may be regarded as content of a data process in a normal operation which was previously performed by either one of both CPUA 2 and CPUB 6.

[Second Embodiment]

<<Another Configuration of Buffer Memory>>

FIG. 19 is a diagram illustrating another configuration of the bufferA 11 and the bufferB 12 which are buffer memories according to the second embodiment of the present invention, included in the dual-core microcontroller MCU 1 shown in FIG. 1.

Differences between the bufferA 11 and bufferB 12 which are buffer memories according to the second embodiment of the present invention shown in FIG. 19 and the bufferA 11 and bufferB 12 which are buffer memories according to the first embodiment of the present invention shown in FIG. 2 are as follows.

In other words, an operating circuit (OP) 1170 which is not included in the buffer memories according to the first embodiment of the present invention shown in FIG. 2 is added to the buffer memoryA 11 and buffer memoryB 12 according to the second embodiment of the present invention shown in FIG. 19.

As shown in FIG. 19, write data WD and a buffer output signal BO of the flip-flop (FF) 1150 are respectively supplied to one input terminal and the other input terminal of the operating circuit (OP) 1170, and an output terminal of the operating circuit (OP) 1170 is connected to the data input terminal of the flip-flop (FF) 1150. In addition, as shown in FIG. 19, a power-on reset signal RST and a counter reset signal CNR from the control unit 16 are logically summed by the OR circuit 1140, and the counter (CNT) 1160 and the flip-flop (FF) 1150 are reset by an output of the OR circuit 1140.

In the buffer memoryA 11 and buffer memoryB 12 shown in FIG. 19, the operating circuit (OP) 1170 performs an operating process on the write data WD and the buffer output signal BO which are respectively supplied to one input terminal and the other input terminal according to a predetermined operating algorithm, and thus an output signal based on a result of the operating process is generated from the output terminal of the operating circuit (OP) 1170. The output signal generated from the output terminal of the operating circuit (OP) 1170 is stored in the flip-flop (FF) 1150 in a duration when the buffer write enable signal BWE generated from the output of the AND circuit 1130 is in a high level "1".

Therefore, in the buffer memoryA 11 and buffer memoryB 12 shown in FIG. 19, output signals which depend on all values of a plurality of write data items WD sequentially supplied from the CPUA 2 and CPUB 6 are generated from the output terminal of the operating circuit (OP) 1170. As a result, even if only some of a plurality of write data items WD which are sequentially supplied from the CPUA 2 to the buffer memoryA 11 and a plurality of write data items WD which are sequentially supplied from the CPUB 6 to the buffer memoryB 12 are different from each other, output signals generated from the output terminal of the operating circuit (OP) 1170 of the buffer memoryA 11 are different from output signals generated from the output terminal of the operating circuit (OP) 1170 of the buffer memoryB 12.

For this reason, the buffer memoryA 11 and buffer memoryB 12 according to the second embodiment of the present invention shown in FIG. 19 are used in the dual-core microcontroller MCU 1 shown in FIG. 1, and thus it is possible to considerably improve a probability of detecting abnormality of one of both CPUA 2 and CPUB 6. In addition, as an operating algorithm of the operating circuit (OP) 1170 for allowing values of a plurality of write data items WD sequentially supplied to the buffer memoryA 11 and buffer memoryB 12 to influence a value of the buffer output signal BO, a relatively simple logical operation such as logical sum OR, logical product AND, or exclusive-OR EXOR is selected. There is an advantage in that the operating circuit (OP) 1170 realizes high speed by using a relatively simple logical operation.

<<Operation of Buffer Memory Having Operating Function>>

Figure 20:
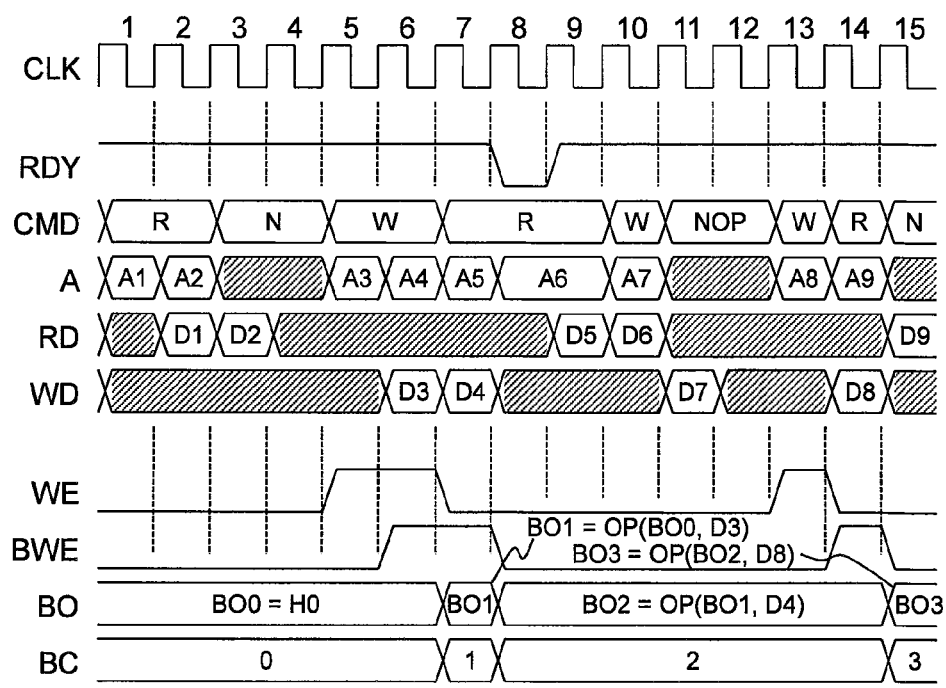
FIG. 20 is a diagram illustrating an operation of the buffer memoryA 11 and the buffer memoryB 12 having an operating function according to the second embodiment of the present invention shown in FIG. 19.

FIG. 20 is a diagram illustrating an operation of the buffer memoryA 11 and the buffer memoryB 12 having the operating function according to the second embodiment of the present invention shown in FIG. 19.

Differences between an operation of the buffer memoryA and buffer memoryB 12 having the operating function according to the second embodiment of the present invention shown in FIG. 20 and the operation of the bufferA 11 and bufferB 12 according to the first embodiment of the present invention shown in FIG. 3 are as follows.

In other words, in the operation of the buffer memoryA and buffer memoryB 12 having the operating function according to the second embodiment of the present invention shown in FIG. 20, a value of the buffer output signal BO of the flip-flop (FF) 1150 is set to an initial value BO0 (=H0) in first to sixth durations of the clock signals CLK.

Next, between the seventh and eighth durations of the clock signals CLK, a value of the buffer output signal BO of the flip-flop (FF) 1150 is a value BO1 (=OP(BO0, D3)) obtained as an operating result of the operating process (OP) of the initial value BO0 and data D3 of the write data WD.

Further, between the eighth and fourteenth durations of the clock signals CLK, a value of the buffer output signal BO of the flip-flop (FF) 1150 is a value BO2 (=OP (B01, D4)) obtained as an operating result of the operating process (OP) of the previous operating result value B01 and data D4 of the write data WD.

In addition, between the fourteenth and fifteenth durations of the clock signals CLK, a value of the buffer output signal BO of the flip-flop (FF) 1150 is a value BO3 (=OP (BO2, D8)) obtained as an operating result of the operating process (OP) of the previous operating result value BO2 and data D8 of the write data WD.

As described above, according to the second embodiment of the present invention shown in FIGS. 19 and 20, in the buffer memoryA 11 and buffer memoryB 12, output signals which depend on all values of a plurality of write data items WD sequentially supplied from the CPUA 2 and CPUB 6 are generated from the output terminal of the operating circuit (OP) 1170. For this reason, the buffer memoryA 11 and buffer memoryB 12 according to the second embodiment of the present invention shown in FIG. 19 are used in the dual-core microcontroller MCU 1 shown in FIG. 1, and thus it is possible to considerably improve a probability of detecting abnormality of one of both CPUA 2 and CPUB 6.

[Third Embodiment]

<<Configuration of Single-core Microcontroller>>

FIG. 21 is a diagram illustrating a configuration of a single-core microcontroller MCU 1 according to the third embodiment of the present invention.

Differences between the single-core microcontroller MCU 1 according to the third embodiment of the present invention shown in FIG. 21 and the dual-core microcontroller MCU 1 according to the first embodiment of the present invention shown in FIG. 1 are as follows.

In other words, in the single-core microcontroller MCU 1 according to the third embodiment of the present invention shown in FIG. 21, multiple redundant operations for realizing high reliability are not performed through parallel operations by both CPUA 2 and CPUB 6 as shown in FIG. 1 but are performed through double operations by a single CPUA 2.

Therefore, in the single-core microcontroller MCU 1 according to the third embodiment of the present invention shown in FIG. 21, the CPUB 6, the memoryB 7, the CPUB bus 8, and the bridgeB 9 included in the dual-core microcontroller MCU 1 according to the first embodiment of the present invention shown in FIG. 1 are omitted. Alternatively, in the single-core microcontroller MCU 1 according to the third embodiment of the present invention shown in FIG. 21, the bufferB 12 is connected to the CPUA bus 4, and thus the bufferB 12 holds data which is output to a specific address space from the CPUA 2 and counts the number of outputs.

For example, in the double operations, the single CPUA 2 executes the same redundant task program on the same operand data twice. Through the first operation, that is, one operation of the double operations, data to be written which is output to a specific address space from the CPUA 2 is doubly written in the memoryA 3 and the bufferA 11. Through the second operation, that is, the other operation of the double operations, data to be written which is output to a specific address space from the CPUA 2 is doubly written in the memoryA 3 and the bufferB 12.

In a case where there is no failure in the single-core microcontroller MCU 1 according to the third embodiment of the present invention shown in FIG. 21, and the single CPUA 2 is normally operated at all times, written data items which are stored in the bufferA 11 and bufferB 12 are the same as each other. However, in a case where a failure occurs in the single-core microcontroller MCU 1 according to the third embodiment of the present invention shown in FIG. 21, and the single CPUA 2 is abnormally operated, written data items which are stored in the bufferA 11 and bufferB 12 mismatch each other, and thus the failure can be detected.

Also in the single-core microcontroller MCU 1 according to the third embodiment of the present invention shown in FIG. 21, in the same manner as in the first embodiment of the present invention shown in FIG. 1, both FIFOA 13 and FIFOB 14 select only data items having a predetermined number of outputs from a plurality of data items which are sequentially output and supplied from the CPUA 2 via both bufferA 11 and bufferB 12 as results of the redundant task operation so as to be stored, and do not select data of other numbers of outputs so as to be discarded. The data items having the predetermined number of outputs which are selected and output by both FIFOA 13 and FIFOB 14 are compared with each other by the comparator 15. If a comparison result performed by the comparator 15 indicates match, it is determined that there is no failure in the single-core microcontroller MCU 1 shown in FIG. 21, and if a comparison result performed by the comparator 15 indicates mismatch, it is determined that there is a failure in the single-core microcontroller MCU 1 shown in FIG. 21.

Further, in the single-core microcontroller MCU 1 according to the third embodiment of the present invention shown in FIG. 21, the buffer memoryA 11 and buffer memoryB 12 having the operating function according to the second embodiment of the present invention shown in FIGS. 19 and 20 are used as the bufferA 11 and bufferB 12, and thus it is possible to improve considerably a probability of detecting abnormality of the single CPUA 2.

Figure 22:
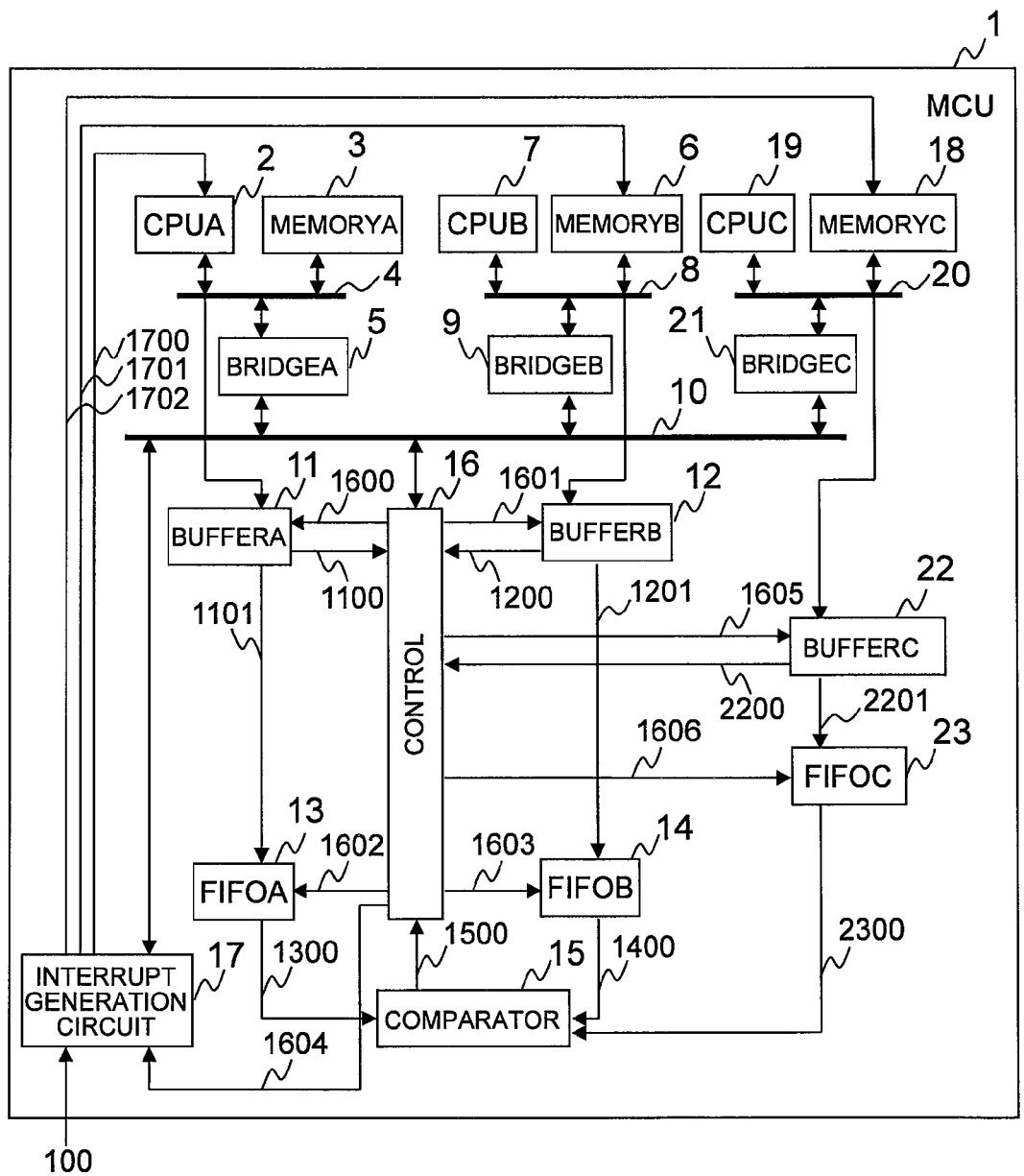
FIG. 22 is a diagram illustrating a configuration of a triple-core microcontroller MCU 1 according to a fourth embodiment of the present invention.

[Fourth Embodiment]
<<Configuration of Triple-core Microcontroller>>
FIG. 22 is a diagram illustrating a configuration of a triple-core microcontroller MCU 1 according to the fourth embodiment of the present invention.

Differences between the triple-core microcontroller MCU 1 according to the fourth embodiment of the present invention shown in FIG. 22 and the dual-core microcontroller MCU 1 according to the first embodiment of the present invention shown in FIG. 1 are as follows.

In other words, a CPUC 18 which is a third central processing unit, a memoryC 19 which is a third built-in memory, a CPUC bus 20 which is a third CPU bus, a bridgeC 21 which is a third bus bridge, a bufferC 22 which is a third buffer memory, and a FIFOC 23 which is a third FIFO memory are added to the triple-core microcontroller MCU 1 according to the fourth embodiment of the present invention shown in FIG. 22.

The bufferC 22 which is a third buffer memory holds data to be written which is output to a specific address space by the CPUC 18 and counts the number of outputs thereof. The bufferC 22 which is a third buffer memory also holds data to be written which is output to a specific address space by the CPUC 18 and counts the number of outputs thereof. The FIFOC 23 which is a third FIFO memory holds output data 2201 of the bufferC 22.

The comparator 15 compares output data 1300 of the FIFOA 13, output data 1400 of the FIFOB 14, and output data 2300 of the FIFO memory.

<<Normal Operation in Triple-core Microcontroller>>
The triple-core microcontroller MCU 1 according to the fourth embodiment of the present invention shown in FIG. 22 enables the three CPUA 2, CPUB 6 and CPUC 18 to execute independent data processes in parallel in order to realize a high performance. Parallel process results performed by the three CPUA 2, CPUB 6 and CPUC 18 may be stored in parallel in the three memoryA 3, memoryB 7 and memoryC 19. Further, data of the three memoryA 3, memoryB 7 and memoryC 19 may be transmitted to the system bus 10 via the three bridgeA 5, bridgeB 9 and bridgeC 21.

<<Redundant Operation In Triple-core Microcontroller>>
In order to realize a high reliability, the triple-core microcontroller MCU 1 according to the fourth embodiment of the present invention shown in FIG. 22 executes a redundant operation in which the three CPUA 2, CPUB 6 and CPUC 18 are made to execute the same data process and failures are detected by detecting mismatch between process results.

For this redundant operation, the three CPUA 2, CPUB 6 and CPUC 18 execute the same redundant task program on the same operand data. In a case where there is no failure in the triple-core microcontroller MCU 1 shown in FIG. 22 and the three CPUA 2, CPUB 6 and CPUC 18 are normally operated, data items to be written, which are output to specific address spaces from the three CPUA 2, CPUB 6 and CPUC 18 and are doubly written in the memoryA 3, memoryB 7 and memoryC 18, and the bufferA 11, bufferB 12 and bufferC 22 are the same as each other. However, in a case where a failure occurs in the triple-core microcontroller MCU 1 shown in FIG. 22 and one of the three CPUA 2, CPUB 6 and CPUC 18 is abnormally operated, data items to be written, which are output to specific address spaces from the three CPUA 2, CPUB 6 and CPUC 18 and are doubly written in the memoryA 3, memoryB 7 and memoryC 18, and the bufferA 11, bufferB 12 and bufferC 22, do not mismatch each other, and thus the failure can be detected.

The three FIFOA 13, FIFOB 14 and FIFOC 23 select only data items having a predetermined number of outputs from a plurality of data items which are sequentially output and supplied from the three CPUA 2, CPUB 6 and CPUC 18 via the three bufferA 11, bufferB 12 and bufferC 22 as results of the redundant task operation so as to be stored, and do not select data of other numbers of outputs so as to be discarded. The data items having the predetermined number of outputs which are selected and output by the three FIFOA 13, FIFOB 14 and FIFOC 23 are compared with each other by the comparator 15. If a comparison result performed by the comparator 15 indicates match, it is determined that there is no failure in the triple-core microcontroller MCU 1 shown in FIG. 22, and if a comparison result performed by the comparator 15 indicates mismatch, it is determined that there is a failure in the triple-core microcontroller MCU 1 shown in FIG. 22. Therefore, it is possible to solve the problem in which vacant regions disappear in the three FIFOA 13, FIFOB 14 and FIFOC 23 for a short time due to a plurality of data items which are sequentially output from the three high-performance CPUA 2, CPUB 6 and CPUC 18, and thus the three CPUA 2, CPUB 6 and CPUC 18 are easily stalled or wait.

Further, in the triple-core microcontroller MCU 1 according to the fourth embodiment of the present invention shown in FIG. 22, the buffer memories having the operating function according to the second embodiment of the present invention shown in FIGS. 19 and 20 are used as the bufferA 11, bufferB 12 and bufferC 22, and thus it is possible to considerably improve a probability of detecting abnormality of the single CPUA 2.

[Fifth Embodiment]

<<Configuration of Another Triple-core Microcontroller>>

Figure 23:
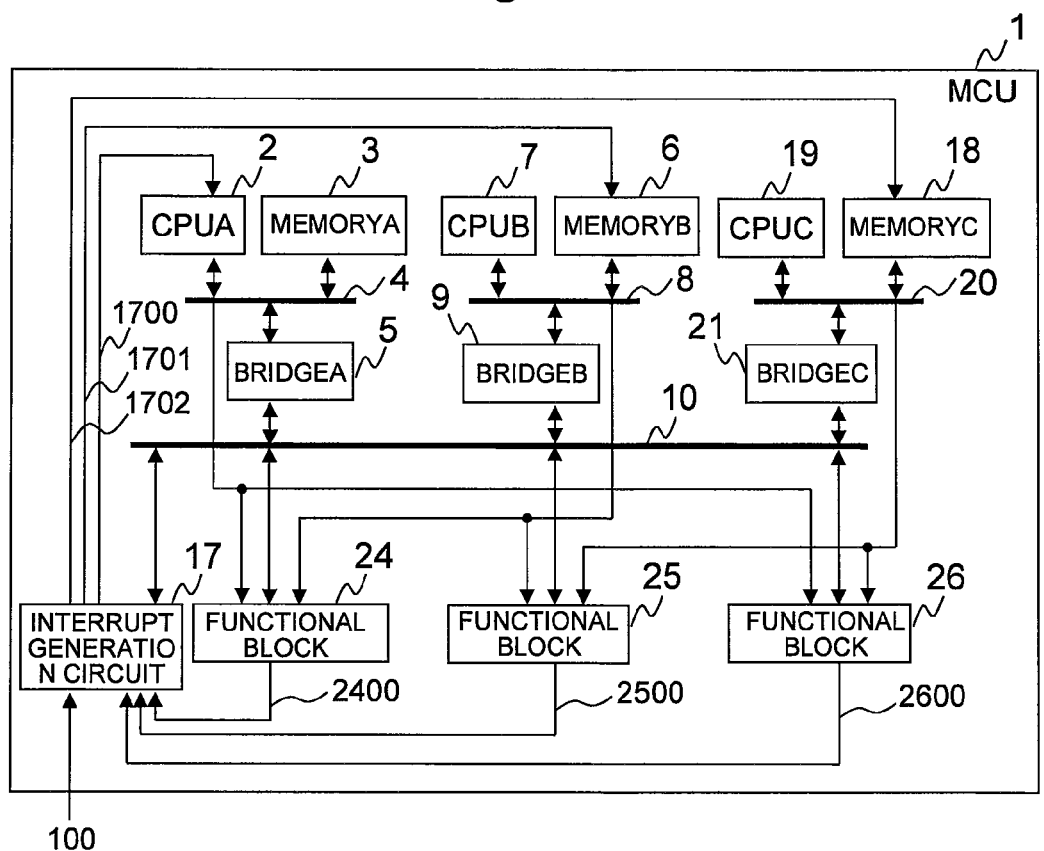
FIG. 23 is a diagram illustrating a configuration of another triple-core microcontroller MCU 1 according to a fifth embodiment of the present invention.

FIG. 23 is a diagram illustrating a configuration of another triple-core microcontroller MCU 1 according to the fifth embodiment of the present invention.

Differences between the triple-core microcontroller MCU 1 according to the fifth embodiment of the present invention shown in FIG. 23 and the triple-core microcontroller MCU 1 according to the fourth embodiment of the present invention shown in FIG. 22 are as follows.

In other words, in the triple-core microcontroller MCU 1 according to the fifth embodiment of the present invention shown in FIG. 23, three functional blocks 24, 25 and 26 perform detection of match and mismatch between process results by the three CPUA 2, CPUB 6 and CPUC 18.

Configurations of the three functional blocks 24, 25 and 26 included in the triple-core microcontroller MCU 1 according to the fifth embodiment of the present invention shown in FIG. 23 are the same as each other. Particularly, each of the three functional blocks 24, 25 and 26 includes the bufferA 11, the bufferB 12, the FIFOA 13, the FIFOB 14, the comparator 15, and the control unit 16, described in the first embodiment of the present invention shown in FIGS. 1 to 18.

Therefore, the first functional block 24 may compare output data of the first CPUA 2 with output data of the second CPUB 6, and may output an interrupt request 2400 to the interrupt generation circuit 17 in a case where the output data items of both mismatch each other. In addition, the second functional block 25 may compare output data of the second CPUB 6 with output data of the third CPUC 18, and may output an interrupt request 2500 to the interrupt generation circuit 17 in a case where the output data items of both mismatch each other. Finally, the third functional block 26 may compare output data of the first CPUA 2 with output data of the third CPUC 18, and may output an interrupt request 2600 to the interrupt generation circuit 17 in a case where the output data items of both mismatch each other. The interrupt generation circuit 17 may receive three interrupt requests from the three functional blocks 24, 25 and 26. Therefore, an exception process is started, in which a notification indicating that a failure occurs in the triple-core microcontroller MCU 1 according to the fifth embodiment of the present invention shown in FIG. 23 and one of the three CPUA 2, CPUB 6 and CPUC 18 is abnormally operated is sent, in response to any one of the interrupt request signals 2400, 2500 and 2600 to the interrupt generation circuit 17.

Sixth Embodiment

<<Mounting of High Reliability Microcontroller in Automobile>>

Figure 24:
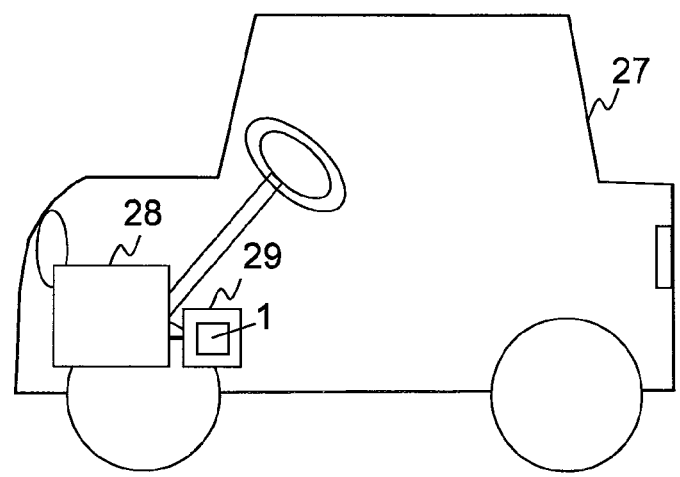
FIG. 24 is a diagram illustrating a configuration of an automobile according to a sixth embodiment of the present invention, equipped with the dual-core microcontroller MCU 1 according to the first embodiment of the present invention shown in FIGS. 1 to 18, the dual-core microcontroller MCU 1 using the buffer memoryA 11 and the buffer memoryB 12 having the operating function according to the second embodiment of the present invention shown in FIGS. 19 and 20, the single-core microcontroller MCU 1 according to the third embodiment of the present invention shown in FIG. 21, the triple-core microcontroller MCU 1 according to the fourth embodiment of the present invention shown in FIG. 22, or the triple-core microcontroller MCU 1 according to the fifth embodiment of the present invention shown in FIG. 23.

FIG. 24 is a diagram illustrating a configuration of an automobile according to the sixth embodiment of the present invention, equipped with the dual-core microcontroller MCU 1 according to the first embodiment of the present invention shown in FIGS. 1 to 18, the dual-core microcontroller MCU 1 using the buffer memoryA 11 and the buffer memoryB 12 having the operating function according to the second embodiment of the present invention shown in FIGS. 19 and 20, the single-core microcontroller MCU 1 according to the third embodiment of the present invention shown in FIG. 21, the triple-core microcontroller MCU 1 according to the fourth embodiment of the present invention shown in FIG. 22, or the triple-core microcontroller MCU 1 according to the fifth embodiment of the present invention shown in FIG. 23.

As described above, the microcontroller MCU 1 according to various embodiments of the present invention has a function of performing multiple redundant operations in order to realize high reliability. Particularly, a failure of the microcontroller MCU 1 can be detected using the function of performing multiple redundant operations. As a result, as long as a failure of the microcontroller MCU 1 is not detected, an operation result of the microcontroller MCU 1 according to the various embodiments of the present invention has high reliability, and thus the microcontroller MCU 1 can be mounted in an automobile which is required to have high safety and high accuracy.

FIG. 24 shows a state in which the above-described microcontroller MCU 1 according to the various embodiments of the present invention is mounted inside an electronic control unit (ECU) 29 which controls an engine 28 of an automobile 27. Therefore, according to the sixth embodiment of the present invention shown in FIG. 24, it is possible to control the engine 28 of the automobile 27 with high reliability and with high accuracy.

As above, although the invention made by the present inventor have been described in detail based on the embodiments, the present invention is not limited thereto and may be variously modified within the scope without departing from the spirit thereof.

For example, the present invention may be applied to a quadruple-core microcontroller MCU 1 having four CPUs. In this case, four buffers and four FIFOs are used, and output signals of the four FIFOs are supplied to a comparator.

Further, the present invention is not limited to multiple redundant operations for detecting failures of a built-in CPU of a microcontroller. The present invention may be applied to multiple redundant operations for detecting failures of various built-in function modules of a semiconductor integrated circuit which is used in a wide range of applications, such as, for example, a floating point number processing unit (FPU), an encryption processing processor, an MPEG decoder, a 2D image processing processor, or a 3D image processing processor.

Furthermore, the present invention is not limited to multiple redundant operations for a failure detection operation in an initialization sequence when a semiconductor integrated circuit is powered on before a normal operation or multiple redundant operations for a failure detection operation after the normal operation is started. The multiple redundant operations for inspecting a semiconductor integrated circuit according to the present invention may be applied to, for example, a Built In Self Test (BIST) which is a test for discriminating good products from poor products of semiconductor chips of semiconductor integrated circuits at a semiconductor wafer stage before factory shipment.

INDUSTRIAL APPLICABILITY

The present invention is widely applicable to multiple redundant operations for inspecting a semiconductor integrated circuit having a function module and a built-in memory.

EXPLANATION OF REFERENCE NUMERALS

1 Microcontroller MCU
2 First central processing unit (CPUA)
3 First built-in memory (memoryA)
4 First CPU bus (CPUA bus)
5 First bus bridge (bridgeA)
6 Second central processing unit (CPUB)
7 Second built-in memory (memoryB)
8 Second CPU bus (CPUB bus)
9 Second bus bridge (bridgeB)
10 System bus
11 First buffer memory (bufferA)
12 Second buffer memory (bufferB)
13 First FIFO memory (FIFOA)
14 Second FIFO memory (FIFOB)
15 Comparator
16 Control unit
17 Interrupt generation circuit

What is claimed is:

1. A semiconductor integrated circuit comprising:
a first processor which executes a first operation;
a second processor which executes a second operation which is redundant with the first operation;
a first buffer memory which stores a plurality of first data items output from the first processor during the first operation;
a second buffer memory which stores a plurality of second data items output from the second processor during the second operation;
a first FIFO memory which selects and stores only a predetermined number of the first data items sequentially output from the first buffer memory;
a second FIFO memory which selects and stores only the predetermined number of the second data items sequentially output from the second buffer memory;
a comparator which respectively compares the predetermined number of first data items output from the first FIFO memory with the predetermined number of second data items output from the second FIFO memory and outputs respective comparison results,
wherein a total number of the first data items is equal to a total number of the second data items, and the predetermined number is less than the total number,
a first built-in memory which stores instructions which cause the first processor to execute the first operation; and
a second built-in memory which stores instructions which cause the second processor to execute the second operation,
wherein the first data items output from the first processor are stored in the first built-in memory, and
wherein the second data items output from the second processor are stored in the second built-in memory,
wherein the first buffer memory counts a first number of the plurality of first data items which are sequentially supplied to the first buffer memory during the first operation, and
wherein the second buffer memory counts a second number of the plurality of second data items which are sequentially supplied to the second buffer memory during the second operation,
a control unit that is connected to the first buffer memory, the second buffer memory, the first FIFO memory, and the second FIFO memory,
wherein the control unit includes a first register and a second register which can store information of the predetermined number of outputs,
wherein, when the first number of the first data items counted by the first buffer memory matches information stored in the first register, the control unit supplies a first FIFO write enable signal to cause the first FIFO memory to select and store the predetermined number of first data items, and
wherein, when the second number of the second data items counted by the second buffer memory matches information stored in the second register, the control unit supplies a second FIFO write enable signal to cause the second FIFO memory to select and store the predetermined number of second data items.

2. The semiconductor integrated circuit according to claim 1, further comprising:
a multi-core controller in which the first processor and the second processor are disposed.

3. The semiconductor integrated circuit according to claim 2, wherein the first operation and the second operation are performed in parallel one or more times.

4. The semiconductor integrated circuit according to claim 3, wherein execution of the first operation and the second operation is triggered by an interrupt to one of the first processor and the second processor.

5. The semiconductor integrated circuit according to claim 1,
wherein the first buffer memory includes a first flip-flop that stores the predetermined number of the first data items output to the first FIFO memory and a first operating circuit that has one input terminal to which the first data items are supplied and another input terminal to which output data of an output terminal of the first flip-flop are supplied, and an output signal generated from an output terminal of the first operating circuit is stored in the first flip-flop, and
wherein the second buffer memory includes a second flip-flop that stores the predetermined number of the second data items output to the second FIFO memory and a second operating circuit that has one input terminal to which the second data items are supplied and another input terminal to which output data of an output terminal of the second flip-flop are supplied, and an output signal generated from an output terminal of the second operating circuit is stored in the second flip-flop.

6. The semiconductor integrated circuit according to claim 1,
wherein, when the comparison results output by the comparator indicate that the predetermined number of first data items and the predetermined number of second data items respectively match each other, the semiconductor integrated circuit is determined as being normal, and when one of the comparison results indicates that respective ones of the predetermined number of first data items and the predetermined number of second data items are a mismatch, the semiconductor integrated circuit is determined as being abnormal.

7. The semiconductor integrated circuit according to claim 1, further comprising:
a microcontroller which includes the first processor, the second processor, first built-in memory, and a second built-in memory, which are configured as multiple cores which execute a normal operation in parallel.

8. A method for operating a semiconductor integrated, the method comprising:
executing a first operation with a first processor;
executing a second operation with a second processor, where the second operation is redundant with the first operation;
storing a plurality of first data items output from the first processor during the first operation in a first buffer memory;
storing a plurality of second data items output from the second processor during the second operation in a second buffer memory;
selecting and storing only a predetermined number of the first data items sequentially output from the first buffer memory in a first FIFO memory;
selecting and storing only the predetermined number of the second data items sequentially output from the second buffer memory in a second FIFO memory; and
comparing the predetermined number of first data items output from the first FIFO memory with the predetermined number of second data items output from the second FIFO memory, respectively, with a comparator and outputting respective comparison results,
wherein a total number of the first data items is equal to a total number of the second data items, and the predetermined number is less than the total number,
wherein a first built-in memory stores instructions which cause the first processor to execute the first operation,
wherein a second built-in memory which stores instructions which cause the second processor to execute the second operation,
wherein the first data items output from the first processor are stored in the first built-in memory, and
wherein the second data items output from the second processor are stored in the second built-in memory,
wherein the first buffer memory counts a first number of the plurality of first data items which are sequentially supplied to the first buffer memory during the first operation,
wherein the second buffer memory counts a second number of the plurality of second data items which are sequentially supplied to the second buffer memory during the second operation,
counting the first data items by the first buffer memory;
counting the second data items by the second buffer memory;
when a first number of the first data items counted by the first buffer memory matches information stored in a first register, supplying a first FIFO write enable signal to cause the first FIFO memory to select and store the predetermined number of first data items; and
when a second number of the second data items counted by the second buffer memory matches information stored in a second register, supplying a second FIFO write enable signal to cause the second FIFO memory to select and store the predetermined number of second data items.

9. The method for operating a semiconductor integrated circuit according to claim 8,
wherein the first processor and the second processor are disposed in a multi-core controller.

10. The method for operating a semiconductor integrated circuit according to claim 9, wherein the first operation and the second operation are performed in parallel.

11. The method for operating a semiconductor integrated circuit according to claim 10, further comprising:
triggering execution of the first operation and the second operation by supplying an interrupt to one of the first processor and the second processor.

12. The method for operating a semiconductor integrated circuit according to claim 8,
wherein the first buffer memory includes a first flip-flop that stores the predetermined number of the first data items output to the first FIFO memory and a first operating circuit that has one input terminal to which the first data items are supplied and another input terminal to which output data of an output terminal of the first flip-flop are supplied, and an output signal generated from an output terminal of the first operating circuit is stored in the first flip-flop, and
wherein the second buffer memory includes a second flip-flop that stores the predetermined number of the second data items output to the second FIFO memory and a second operating circuit that has one input terminal to which the second data items are supplied and another input terminal to which output data of an output terminal of the second flip-flop are supplied, and an output signal generated from an output terminal of the second operating circuit is stored in the second flip-flop.

13. The method for operating a semiconductor integrated circuit according to claim 8, further comprising:
when the comparison results output by the comparator indicate that the predetermined number of first data items and the predetermined number of second data items respectively match each other, determining that the semiconductor integrated circuit is normal; and
when one of the comparison results indicates that respective ones of the predetermined number of first data items and the predetermined number of second data items are a mismatch, determining that the semiconductor integrated circuit is abnormal.

14. The method for operating a semiconductor integrated circuit according to claim 8, further comprising:
executing a normal operation in parallel with the first processor and the second processor as a multi-core controller.

* * * * *